US011006468B2

(12) United States Patent
Zhang

(10) Patent No.: US 11,006,468 B2
(45) Date of Patent: May 11, 2021

(54) RELAY IMPLEMENTATION METHOD AND DEVICE

(71) Applicant: HUAWEI TECHNOLOGIES CO., LTD., Guangdong (CN)

(72) Inventor: Xiangdong Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 576 days.

(21) Appl. No.: 15/417,960

(22) Filed: Jan. 27, 2017

(65) Prior Publication Data
US 2017/0142761 A1 May 18, 2017

Related U.S. Application Data

(63) Continuation of application No. PCT/CN2014/083447, filed on Jul. 31, 2014.

(51) Int. Cl.
H04W 76/12 (2018.01)
H04W 74/08 (2009.01)
H04W 88/04 (2009.01)

(52) U.S. Cl.
CPC ......... *H04W 76/12* (2018.02); *H04W 74/08* (2013.01); *H04W 88/04* (2013.01)

(58) Field of Classification Search
CPC combination set(s) only.
See application file for complete search history.

(56) References Cited

U.S. PATENT DOCUMENTS

2010/0309837 A1* 12/2010 Yi .................. H04B 7/155
370/315
2011/0216676 A1 9/2011 Li et al.
(Continued)

FOREIGN PATENT DOCUMENTS

CN 102811497 A 12/2012
CN 103188706 A 7/2013
(Continued)

OTHER PUBLICATIONS

Extended European Search Report, dated Jun. 22, 2017, in European Application No. 14898874.4 (9 pp.).
(Continued)

*Primary Examiner* — Hassan A Phillips
*Assistant Examiner* — Prenell P Jones
(74) *Attorney, Agent, or Firm* — Fish & Richardson P.C.

(57) ABSTRACT

One example relay implementation method includes setting up a first bearer to a second terminal, where the first terminal serves as a relay device between the second terminal and a base station, receiving, by using the first bearer, a service request message, forwarding the service request message to the base station, receiving a first service response message sent by the base station, forwarding the first service response message to the second terminal by using the first bearer, where the first service response message comprises first configuration information, and the first configuration information is configuration information of bearers between the base station and the second terminal, and setting up a second bearer to the second terminal and a third bearer to the base station according to fourth configuration information, where the second bearer and the third bearer serve as the bearers between the second terminal and the base station.

19 Claims, 9 Drawing Sheets

(56) References Cited

U.S. PATENT DOCUMENTS

| | | | | |
|---|---|---|---|---|
| 2012/0009931 | A1* | 1/2012 | Ma | H04B 7/155 455/450 |
| 2012/0163296 | A1* | 6/2012 | Cheon | H04W 76/10 370/328 |
| 2012/0250601 | A1 | 10/2012 | Choi et al. | |
| 2013/0017779 | A1* | 1/2013 | Song | H04W 76/45 455/39 |
| 2013/0331093 | A1 | 12/2013 | Cho et al. | |
| 2014/0038622 | A1* | 2/2014 | Zhu | H04W 72/04 455/450 |
| 2014/0106746 | A1* | 4/2014 | Liu | H04W 24/02 455/435.1 |
| 2014/0328246 | A1* | 11/2014 | Xu | H04W 88/04 370/315 |
| 2016/0088545 | A1* | 3/2016 | Ronneke | H04W 8/18 455/418 |
| 2017/0201871 | A1* | 7/2017 | Ryu | H04W 4/70 |

FOREIGN PATENT DOCUMENTS

| | | |
|---|---|---|
| CN | 103415059 A | 11/2013 |
| EP | 2410809 | 1/2012 |
| EP | 2908595 | 8/2015 |
| EP | 2916611 | 9/2015 |
| JP | 2010-283672 | 12/2010 |
| JP | 2013-30867 | 2/2013 |
| JP | 2014049956 A | 3/2014 |
| JP | 2014107618 A | 6/2014 |
| RU | 2 486 711 C2 | 6/2013 |
| WO | 2010105410 A1 | 9/2010 |
| WO | WO2014067104 | 5/2014 |
| WO | WO2014079023 | 5/2014 |

OTHER PUBLICATIONS

International Search Report dated May 12, 2015 in corresponding International Application No. PCT/CN2014/083447.

"TR 23.703 version 2.0.0: 'Study on architecture enhancements to support Proximity-based Services (ProSe) (Release 12)' for Approval," 3GPP, TSG SA Meeting #63, Mar. 5-7, 2014, SP-140116, 10 pgs.

Office Action dated Apr. 3, 2018, in corresponding Japanese Patent Application No. 2017-505136, 9 pgs.

Notice of Reasons for Rejection, dated Nov. 6, 2018, in Japanese Application No. 2017505136 (7 pp.).

International Search Report dated May 12, 2015 in corresponding International Patent Application No. PCT/CN2014/083447.

3GPP, 3$^{rd}$ Generation Partnership Project; Technical Specification Group Radio Access Network; Evolved Universal Terrestrial Radio Access (E-UTRA);Radio Resource Control (RRC);Protocol specification (Release 12), 3GPP TS 36.331 V12.2.0, Jun. 2014.

3GPP, 3$^{rd}$ Generation Partnership Project; Technical Specification Group Radio Access Network; Evolved Universal Terrestrial Radio Access (E-UTRA);Radio Resource Control (RRC); Protocol specification (Release 12), 3GPP TS 36.413 V12.2.0 Jun. 2014.

Russian Office Action dated Aug. 17, 2018 in corresponding Russian Patent Application No. 2017136996/08, 8 pgs.

Office Action, dated Jan. 2, 2019, in Chinese Application No. 201480035197.0 (11 pp.).

\* cited by examiner

RELAY IMPLEMENTATION METHOD AND DEVICE

CROSS-REFERENCE TO RELATED APPLICATIONS

This application is a continuation of International Application No. PCT/CN2014/083447, filed on Jul. 31, 2014, the disclosure of which is hereby incorporated by reference in its entirety.

TECHNICAL FIELD

Embodiments of the present invention relate to the field of communications technologies, and in particular, to a relay implementation method and device.

BACKGROUND

The Internet of things refers to a network in which various devices having sensing, computation, execution, and communication capabilities are deployed to obtain information about the physical world and implement information transmission, coordination, and processing by using the network, so as to implement interconnection between human beings and things and between things. Machine to machine (M2M for short) communication mainly studies how a mobile communications network bears an Internet of things application, and a device that performs M2M communication is referred to as a machine type communication (MTC for short) device. Some MTC devices such as a smart meter and a smart home device are sensitive to costs and power consumption. For some MTC devices in a special environment, for example, a smart meter located in a basement, a great penetration loss of a network signal occurs before the network signal arrives at the MTC devices. Therefore, reducing costs and power consumption of MTC devices and enhancing signal coverage of a mobile communications network are both helpful for promoting use of the mobile communications network in Internet of things applications.

In the prior art, an MTC device can access a network by using a dedicated relay device that is disposed between the MTC device and a base station. The relay device is a base station relative to the MTC device, and the relay device is user equipment (UE for short) relative to the base station. Information transmitted between the MTC device and the base station is processed and forwarded by the relay device, so that power consumption of the MTC device can be reduced and signal coverage of the mobile communications network can be enhanced to some extent. However, costs of the dedicated relay device are high, causing an increase of network deployment costs for supporting applications. In addition, the relay device needs to perform additional processing on used resources, and some relay devices divide their coverage into cells, and therefore, network complexity is increased.

SUMMARY

Embodiments of the present invention provide a relay implementation method and device, so as to solve the foregoing problem of high network deployment costs and complex network implementation caused by a relay device.

According to a first aspect, an embodiment of the present invention provides a terminal, where the terminal serves as a first terminal and includes: a processing unit, configured to set up a first bearer to a second terminal, where the first terminal serves as a relay device between the second terminal and a base station; a receiving unit, configured to receive, by using the first bearer, a service request message sent by the second terminal; and a sending unit, configured to forward, to the base station, the service request message received by the receiving unit; where the receiving unit is further configured to receive a first service response message sent by the base station; the sending unit is further configured to forward the first service response message to the second terminal by using the first bearer, where the first service response message includes first configuration information, and the first configuration information is configuration information of bearers between the base station and the second terminal; and the processing unit is further configured to set up a second bearer to the second terminal and a third bearer to the base station according to fourth configuration information, where the second bearer and the third bearer serve as the bearers between the second terminal and the base station.

According to a second aspect, an embodiment of the present invention provides a terminal, where the terminal serves as a second terminal and includes: a processing unit, configured to set up a first bearer to a first terminal, where the first terminal serves as a relay device between the second terminal and a base station; a sending unit, configured to send a service request message to the first terminal by using the first bearer, so that the first terminal forwards the service request message to the base station; and a receiving unit, configured to receive, by using the first bearer, a first service response message sent by the base station and forwarded by the first terminal, where the first service response message includes first configuration information, and the first configuration information is configuration information of bearers between the base station and the second terminal; where the processing unit is further configured to set up a second bearer to the first terminal according to the first configuration information.

According to a third aspect, an embodiment of the present invention provides a base station, including: a receiving unit, configured to receive, according to a service request message, a second service response message and indication information sent by a network-side device, where the service request message is a service request message sent by a second terminal through a first terminal, the indication information is used to determine first configuration information, and the first configuration information is configuration information of bearers between the base station and the second terminal;

a processing unit, configured to set up, according to the indication information, a sixth bearer associated with the second terminal to the network-side device, determine the first configuration information according to the indication information, and set up a third bearer to the first terminal according to the first configuration information; and a sending unit, configured to send, according to the second service response message received by the receiving unit, a first service response message to the second terminal through the first terminal, where the first service response message includes the first configuration information.

According to a fourth aspect, an embodiment of the present invention provides a network-side device, including: a receiving unit, configured to receive a service request message, where the service request message is a service request message sent by a second terminal through a first terminal and a base station;

a sending unit, configured to send a second service response message and indication information to the base station, where the indication information is used to determine first configuration information, and the first configuration information is configuration information of bearers between the base station and the second terminal; and a processing unit, configured to set up, according to the service request message, a sixth bearer associated with the second terminal to the base station.

According to a fifth aspect, an embodiment of the present invention provides a relay implementation method, including: setting up, by a first terminal, a first bearer to a second terminal, where the first terminal serves as a relay device between the second terminal and a base station; receiving, by the first terminal by using the first bearer, a service request message sent by the second terminal, and forwarding the service request message to the base station; receiving, by the first terminal, a first service response message sent by the base station, and forwarding the first service response message to the second terminal by using the first bearer, where the first service response message includes first configuration information, and the first configuration information is configuration information of bearers between the base station and the second terminal; and setting up, by the first terminal, a second bearer to the second terminal and a third bearer to the base station according to fourth configuration information, where the second bearer and the third bearer serve as the bearers between the second terminal and the base station.

According to a sixth aspect, an embodiment of the present invention provides a relay implementation method, including: setting up, by a second terminal, a first bearer to a first terminal, where the first terminal serves as a relay device between the second terminal and a base station; sending, by the second terminal, a service request message to the first terminal by using the first bearer, so that the first terminal forwards the service request message to the base station; receiving, by the second terminal by using the first bearer, a first service response message sent by the base station and forwarded by the first terminal, where the first service response message includes first configuration information, and the first configuration information is configuration information of bearers between the base station and the second terminal; and setting up, by the second terminal, a second bearer to the first terminal according to the first configuration information.

According to a seventh aspect, an embodiment of the present invention provides a relay implementation method, including: receiving, by a base station according to a service request message, a second service response message and indication information sent by a network-side device, where the service request message is a service request message sent by a second terminal through a first terminal, the indication information is used to determine first configuration information, and the first configuration information is configuration information of bearers between the base station and the second terminal; setting up, by the base station according to the indication information, a sixth bearer associated with the second terminal to the network-side device;

determining, by the base station, the first configuration information according to the indication information; and sending, by the base station according to the second service response message, a first service response message to the second terminal through the first terminal, where the first service response message includes the first configuration information; and setting up a third bearer to the first terminal according to the first configuration information.

According to an eighth aspect, an embodiment of the present invention further provides a relay implementation method, including: receiving, by a network-side device, a service request message, where the service request message is a service request message sent by a second terminal through a first terminal and a base station;

sending, by the network-side device, a second service response message and indication information to the base station, where the indication information is used to determine first configuration information, and the first configuration information is configuration information of bearers between the base station and the second terminal; and setting up, by the network-side device according to the service request message, a sixth bearer associated with the second terminal to the base station.

According to the relay implementation method and device provided by the embodiments of the present invention, a second terminal sets up a first bearer to a first terminal, and sends a service request message to the first terminal by using the first bearer, so that the first terminal forwards the service request message to the base station, and that the base station sets up, according to the service request message, a bearer associated with the second terminal to a network-side device; then the second terminal receives, by using the first bearer, a first service response message sent by the base station and forwarded by the first terminal; and then the second terminal sets up a bearer between the second terminal and the base station to the base station through the first terminal. Therefore, a process of setting up a bearer between the second terminal and the network-side device is implemented, and further, a process in which a terminal serves as a relay device between another terminal and the base station is implemented, network deployment costs may be reduced, and network complexity may be reduced.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
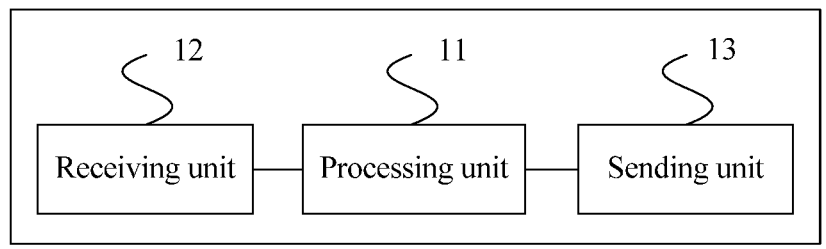
FIG. 1 is a schematic structural diagram of Embodiment 1 of a terminal according to the present invention.

FIG. 1 is a schematic structural diagram of Embodiment 1 of a terminal according to the present invention. As shown in FIG. 1, the terminal in this embodiment serves as a first terminal and may include a processing unit 11, a receiving unit 12, and a sending unit 13. The processing unit 11 is configured to set up a first bearer to a second terminal, where the first terminal serves as a relay device between the second terminal and a base station. The receiving unit 12 is configured to receive, by using the first bearer, a service request message sent by the second terminal. The sending unit 13 is configured to forward, to the base station, the service request message received by the receiving unit 12. The receiving unit 12 is further configured to receive a first service response message sent by the base station. The sending unit 13 is further configured to forward the first service response message to the second terminal by using the first bearer, where the first service response message includes first configuration information, and the first configuration information is configuration information of bearers between the base station and the second terminal. The processing unit 11 is further configured to set up a second bearer to the second terminal and a third bearer to the base station according to fourth configuration information, where the second bearer and the third bearer serve as the bearers between the second terminal and the base station.

Optionally, that the processing unit 11 is configured to set up a first bearer to a second terminal includes: being configured to set up the first bearer to the second terminal according to bearer configuration information; or the sending unit 13 is further configured to send bearer configuration information to the second terminal before the processing unit 11 sets up the first bearer to the second terminal; and that the processing unit 11 is configured to set up a first bearer to a second terminal includes: being configured to set up the first bearer to the second terminal according to the bearer configuration information sent by the sending unit 13.

Optionally, the processing unit 11 is further configured to set up a fourth bearer to the second terminal according to preset bearer configuration information before the sending unit 13 sends the bearer configuration information to the second terminal; and that the sending unit 13 is configured to send bearer configuration information to the second terminal includes: being configured to send the bearer configuration information to the second terminal by using the fourth bearer.

Optionally, the processing unit 11 is further configured to: before the sending unit 13 sends the bearer configuration information to the second terminal, set up a fifth bearer to the base station, and determine the bearer configuration information according to the fifth bearer.

Optionally, the receiving unit 12 is further configured to receive, before the processing unit 11 sets up the first bearer to the second terminal, a relay request message sent by the second terminal, where the relay request message is used to request the first terminal to serve as the relay device between the second terminal and the base station.

Optionally, the processing unit 11 is further configured to determine, before setting up the first bearer to the second terminal, that the first terminal has a capability of serving as the relay device between the second terminal and the base station.

Optionally, the fourth configuration information is the first configuration information; or the fourth configuration information is second configuration information, and the receiving unit 12 is further configured to receive, by using the first bearer, the second configuration information sent by the second terminal, where the second configuration information is configuration information determined by the second terminal according to the first configuration information.

Optionally, the first configuration information includes at least one of the following information: RRC layer configuration information, PDCP layer configuration information, RLC layer configuration information, MAC layer configuration information, or PHY layer configuration information; and the second configuration information includes at least one of the following information: the RRC layer configuration information, the PDCP layer configuration information, the RLC layer configuration information, the MAC layer configuration information, or the PHY layer configuration information.

Optionally, that the processing unit 11 is configured to set up the second bearer to the second terminal according to the second configuration information includes: being configured to set up the second bearer according to the PDCP layer configuration information in the second configuration information, and MAC layer configuration information and PHY layer configuration information that are specified in a short range transmission protocol, where a configuration of a PDCP layer in the second bearer is the same as a configuration of a PDCP layer in the third bearer.

Optionally, the service request message received by the receiving unit 12 includes at least one of the following information: a relay indication or an identity of the first terminal; and/or the first service response message received by the receiving unit 12 includes at least one of the following information: a relay indication or an identity of the first terminal; where the relay indication is used to indicate that the second terminal communicates with a network-side device by using the relay device, and the identity of the first terminal is used to indicate that the second terminal communicates with the network-side device through the first terminal corresponding to the identity.

Optionally, the processing unit 11 is further configured to set up a mapping relationship between the second bearer and the third bearer after setting up the second bearer to the second terminal and the third bearer to the base station according to the fourth configuration information.

Optionally, the first bearer includes a first signaling radio bearer, the second bearer includes a second signaling radio bearer and a data radio bearer, and the third bearer includes a second signaling radio bearer and a data radio bearer.

Optionally, the receiving unit 12 is further configured to receive, after the processing unit 11 sets up the second bearer to the second terminal and the third bearer to the base station according to the fourth configuration information, a first dedicated bearer setup request message sent by the base station, where the first dedicated bearer setup request message includes third configuration information, and the third configuration information is configuration information of dedicated bearers between the base station and the second terminal; the sending unit 13 is further configured to forward the first dedicated bearer setup request to the second terminal by using the first bearer or the second bearer; and the processing unit 11 is further configured to set up a seventh bearer to the second terminal and an eighth bearer to the base station according to the third configuration information, where the seventh bearer and the eighth bearer serve as the dedicated bearers between the second terminal and the base station.

Optionally, that the processing unit 11 is configured to set up a seventh bearer to the second terminal and an eighth bearer to the base station according to the third configuration information includes: being configured to perform, according to the third configuration information, a bearer reconfiguration between the first terminal and the second terminal to set up the seventh bearer, and a bearer reconfiguration between the first terminal and the base station to set up the eighth bearer.

Optionally, before receiving the dedicated bearer setup request message and the third configuration information sent by the base station, the receiving unit 12 is further configured to receive, by using the first bearer or the second bearer, a bearer resource allocation request message sent by the second terminal; and the sending unit 13 is further configured to forward, to the base station, the bearer resource allocation request message received by the receiving unit 12, where the bearer resource allocation request message is used to request allocation of dedicated bearer resources.

Optionally, the processing unit 11 is further configured to set up a mapping relationship between the seventh bearer and the eighth bearer after setting up the seventh bearer to the second terminal and the eighth bearer to the base station according to the third configuration information.

The terminal in this embodiment may be configured to execute a technical solution executed by a first terminal in the following method embodiment of the present invention. An implementation principle and a technical effect thereof are similar, and are not described herein.

Figure 2:
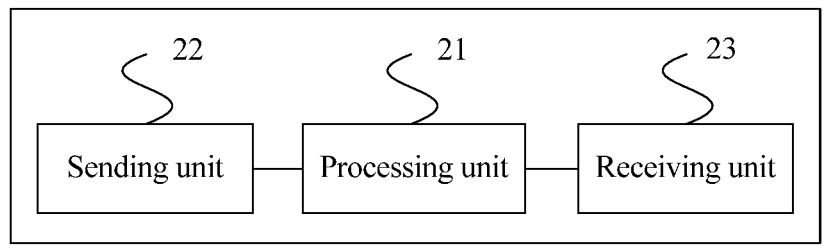
FIG. 2 is a schematic structural diagram of Embodiment 2 of a terminal according to the present invention.

FIG. 2 is a schematic structural diagram of Embodiment 2 of a terminal according to the present invention. As shown in FIG. 2, the terminal in this embodiment serves as a second terminal and may include a processing unit 21, a sending unit 22, and a receiving unit 23. The processing unit 21 is configured to set up a first bearer to a first terminal, where the first terminal serves as a relay device between the second terminal and a base station. The sending unit 22 is configured to send a service request message to the first terminal by using the first bearer, so that the first terminal forwards the service request message to the base station. The receiving unit 23 is configured to receive, by using the first bearer, a first service response message sent by the base station and forwarded by the first terminal, where the first service response message includes first configuration information, and the first configuration information is configuration information of bearers between the base station and the second terminal. The processing unit 21 is further configured to set up a second bearer to the first terminal according to the first configuration information.

Optionally, that the processing unit 21 is configured to set up a first bearer to a first terminal includes: being configured to set up the first bearer to the first terminal according to bearer configuration information; or the receiving unit 23 is further configured to receive, before the processing unit 21 sets up the first bearer to the first terminal, bearer configuration information sent by the first terminal; and that the processing unit 21 is configured to set up a first bearer to a first terminal includes: being configured to set up the first bearer to the first terminal according to the bearer configuration information received by the receiving unit 23.

Optionally, the processing unit 21 is further configured to set up a fourth bearer to the first terminal according to preset bearer configuration information before the receiving unit 23 receives the bearer configuration information sent by the first terminal; and that the receiving unit 23 is configured to receive bearer configuration information sent by the first terminal includes: being configured to receive, by using the fourth bearer, the bearer configuration information sent by the first terminal.

Optionally, the sending unit 22 is further configured to send a relay request message to the first terminal before the processing unit 21 sets up the first bearer to the first terminal, where the relay request message is used to request the first terminal to serve as the relay device between the second terminal and the base station.

Optionally, that the processing unit 21 is configured to set up a second bearer to the first terminal according to the first configuration information includes: being configured to set up the second bearer to the first terminal according to the first configuration information; and the sending unit 22 is further configured to send second configuration information to the first terminal, where the second configuration information instructs the first terminal to set up the second bearer to the second terminal and set up the third bearer to the base station, and the second configuration information is information determined by the processing unit 21 according to the first configuration information.

Optionally, the first configuration information includes at least one of the following information: RRC layer configuration information, PDCP layer configuration information, RLC layer configuration information, MAC layer configuration information, or PHY layer configuration information; and the second configuration information includes at least one of the following information: the RRC layer configuration information, the PDCP layer configuration information, the RLC layer configuration information, the MAC layer configuration information, or the PHY layer configuration information.

Optionally, that the processing unit 21 is configured to set up the second bearer to the first terminal according to the first configuration information includes: being configured to set up the second bearer to the first terminal according to the PDCP layer configuration information in the first configuration information, and MAC layer configuration information and PHY layer configuration information that are specified in a short range transmission protocol, where a configuration of a PDCP layer in the second bearer is the same as a configuration of a PDCP layer in the third bearer.

Optionally, the service request message sent by the sending unit 22 includes at least one of the following information: a relay indication or an identity of the first terminal; and/or the first service response message received by the receiving unit 23 includes at least one of the following information: a relay indication or an identity of the first terminal; where the relay indication is used to indicate that the second terminal communicates with a network-side device by using the relay device, and the identity of the first terminal is used to indicate that the second terminal communicates with the network-side device through the first terminal corresponding to the identity.

Optionally, the first bearer includes a first signaling radio bearer, and the second bearer includes a second signaling radio bearer and a data radio bearer.

Optionally, the receiving unit 23 is further configured to receive, by using the second bearer and/or the first bearer, after the processing unit 21 sets up the second bearer to the first terminal according to the first configuration information, a first dedicated bearer setup request message sent by the base station and forwarded by the first terminal, where the first dedicated bearer setup request message includes third configuration information, and the third configuration information is configuration information of dedicated bearers between the base station and the second terminal; and the processing unit 21 is further configured to set up a seventh bearer to the first terminal according to the third configuration information.

Optionally, that the processing unit 21 is configured to set up a seventh bearer to the first terminal according to the third configuration information includes: being configured to perform a bearer reconfiguration between the second terminal and the first terminal according to the third configuration information to set up the seventh bearer.

Optionally, the sending unit 22 is further configured to send a bearer resource allocation request message to the first terminal by using the first bearer or the second bearer before the receiving unit 23 receives, by using the second bearer, the dedicated bearer setup request message and the third configuration information sent by the base station and forwarded by the first terminal, so that the first terminal forwards the bearer resource allocation request message to the base station by using the third bearer, where the bearer resource allocation request message is used to request allocation of dedicated bearer resources.

The terminal in this embodiment may be configured to execute a technical solution executed by a second terminal in the following method embodiment of the present invention. An implementation principle and a technical effect thereof are similar, and are not described herein.

Figure 3:
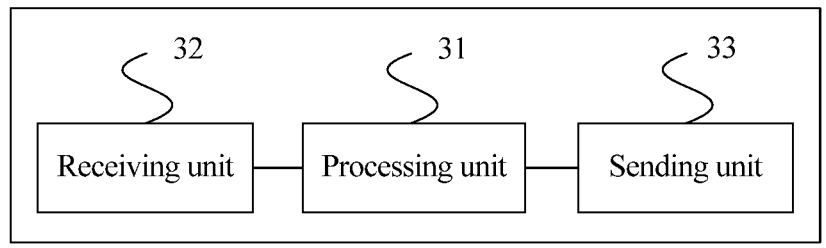
FIG. 3 is a schematic structural diagram of Embodiment 1 of a base station according to the present invention.

FIG. 3 is a schematic structural diagram of Embodiment 1 of a base station according to the present invention. As shown in FIG. 3, the base station in this embodiment may include a processing unit 31, a receiving unit 32, and a sending unit 33. The receiving unit 32 is configured to receive a second service response message and indication information sent by a network-side device, where the service request message is a service request message sent by a second terminal through a first terminal, the indication information is used to determine first configuration information, and the first configuration information is configuration information of bearers between the base station and the second terminal. The processing unit 31 is configured to set up, according to the indication information, a sixth bearer associated with the second terminal to the network-side device, determine the first configuration information according to the indication information, and set up a third bearer to the first terminal according to the first configuration information. The sending unit 33 is configured to send, according to the second service response message received by the receiving unit 32, a first service response message to the second terminal through the first terminal, where the first service response message includes the first configuration information.

Optionally, the processing unit 31 is further configured to set up, according to the service request message, a connection associated with the second terminal to the network-side device before the receiving unit 32 receives, according to the service request message, the second service response message and the indication information sent by the network-side device; and that the processing unit 31 is configured to set up, according to the indication information, a sixth bearer associated with the second terminal to the network-side device includes: being configured to set up, by receiving the second service response message and the indication information over the connection by using the receiving unit 32, the sixth bearer associated with the second terminal to the network-side device.

Optionally, the processing unit 31 is further configured to set up, according to the service request message, a connection associated with the first terminal to the network-side device before the receiving unit 32 receives, according to the service request message, the second service response message and the indication information sent by the network-side device; and that the processing unit is configured to set up, according to the indication information, a sixth bearer associated with the second terminal to the network-side device includes: being configured to set up, by receiving the second service response message and the indication information over the connection by using the receiving unit 32, the sixth bearer associated with the second terminal to the network-side device, where the indication information is further used to indicate an identity of the second terminal.

Optionally, that the processing unit 31 is configured to set up the sixth bearer associated with the second terminal to the network-side device includes: being configured to change a bearer between the base station and the network-side device from associating with the first terminal to associating with the second terminal.

Optionally, the service request message includes at least one of the following information: a relay indication or an identity of the first terminal; and/or the first service response message includes at least one of the following information: a relay indication or an identity of the first terminal; where the relay indication is used to indicate that the second terminal communicates with the network-side device by using a relay device, and the identity of the first terminal is used to indicate that the second terminal communicates with the network-side device through the first terminal corresponding to the identity.

Optionally, the processing unit 31 is further configured to set up a mapping relationship between the sixth bearer and the third bearer after setting up the third bearer to the first terminal according to the first configuration information.

Optionally, the sixth bearer includes an S1 bearer, and the third bearer includes a second signaling radio bearer and a data radio bearer.

Optionally, the receiving unit 32 is further configured to receive, after the processing unit 31 sets up the third bearer to the first terminal according to the first configuration information, a second dedicated bearer setup request message sent by the network-side device; the processing unit 31 is further configured to: set up, according to the second dedicated bearer setup request message received by the receiving unit 32, a ninth bearer associated with the second terminal to the network-side device, where the ninth bearer is a dedicated bearer, and the second dedicated bearer setup request message is used to request the base station to set up a dedicated bearer associated with the second terminal to the network-side device and set up a dedicated bearer of the second terminal to the second terminal; determine third configuration information according to the second dedicated bearer setup request message, where the third configuration information is configuration information of dedicated bearers between the base station and the second terminal; and set up an eighth bearer to the first terminal according to the third configuration information; and the sending unit 33 is further configured to send a first dedicated bearer setup request message to the first terminal according to the second dedicated bearer setup request message received by the receiving unit 32, where the first dedicated bearer setup request message includes the third configuration information, so that the first terminal forwards the first dedicated bearer setup request message to the second terminal by using the second bearer and/or the first bearer, and that the first terminal sets up a seventh bearer to the second terminal according to the third configuration information, where the seventh bearer and the eighth bearer serve as the dedicated bearers between the second terminal and the base station.

Optionally, that the processing unit 31 is configured to set up an eighth bearer to the first terminal according to the third configuration information includes: being configured to perform a bearer reconfiguration between the base station and the first terminal according to the third configuration information to set up the eighth bearer.

Optionally, the receiving unit 32 is further configured to receive, before receiving the second dedicated bearer setup request message sent by the network-side device, a bearer resource allocation request message sent by the second terminal and forwarded by the first terminal, where the bearer resource allocation request message is used to request allocation of dedicated bearer resources; and the sending unit 33 is further configured to forward, to the network-side device, the bearer resource allocation request message received by the receiving unit 32.

Optionally, the processing unit 31 is further configured to set up a mapping relationship between the eighth bearer and the ninth bearer after setting up the eighth bearer to the first terminal according to the third configuration information.

Optionally, the association between the sixth bearer and the second terminal indicates that the identity of the second terminal corresponds to an identity of the sixth bearer.

The base station in this embodiment may be configured to execute a technical solution executed by a base station in the following method embodiment of the present invention. An implementation principle and a technical effect thereof are similar, and are not described herein.

Figure 4:
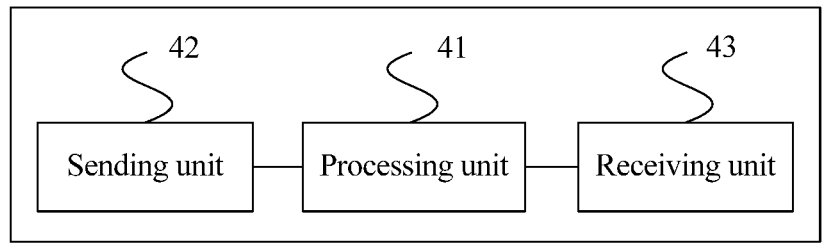
FIG. 4 is a schematic structural diagram of Embodiment 1 of a network-side device according to the present invention.

FIG. 4 is a schematic structural diagram of Embodiment 1 of a network-side device according to the present invention. As shown in FIG. 4, the network-side device in this embodiment may include a processing unit 41, a sending unit 42, and a receiving unit 43. The receiving unit 43 is configured to receive a service request message, where the service request message is a service request message sent by a second terminal through a first terminal and a base station. The sending unit 42 is configured to send a second service response message and indication information to the base station, where the indication information is used to determine first configuration information, and the first configuration information is configuration information of bearers between the base station and the second terminal. The processing unit 41 is configured to set up, according to the service request message, a sixth bearer associated with the second terminal to the base station.

Optionally, the processing unit 41 is further configured to set up, according to the service request message, a connection associated with the second terminal to the base station before the sending unit 42 sends the second service response message and the indication information to the base station; and that the processing unit 41 is configured to set up, according to the service request message, a sixth bearer associated with the second terminal to the base station includes: being configured to set up, according to the service request message, by sending the second service response message and the indication information over the connection by using the sending unit 42, the sixth bearer associated with the second terminal to the base station.

Optionally, the processing unit 41 is further configured to set up, according to the service request message, a connection associated with the first terminal to the base station before the sending unit 42 sends the second service response message and the indication information to the base station; and that the processing unit 41 is configured to set up, according to the service request message, a sixth bearer associated with the second terminal to the base station includes: being configured to set up, according to the service request message, by sending the second service response message and the indication information over the connection by using the sending unit 42, the sixth bearer associated with the second terminal to the base station, where the indication information is further used to indicate an identity of the second terminal.

Optionally, that the processing unit 41 is configured to set up the sixth bearer associated with the second terminal to the base station includes: being configured to change a bearer between the network-side device and the base station from associating with the first terminal to associating with the second terminal.

Optionally, the sixth bearer includes an S1 bearer.

Optionally, the service request message includes at least one of the following information: a relay indication or an identity of the first terminal; and/or the second service response message includes at least one of the following information: a relay indication or an identity of the first terminal; where the relay indication is used to indicate that the second terminal communicates with the network-side device by using a relay device, and the identity of the first terminal is used to indicate that the second terminal communicates with the network-side device through the first terminal corresponding to the identity.

Optionally, the sending unit 42 is further configured to send a second dedicated bearer setup request message to the base station after sending the second service response message and the indication information to the base station; and the processing unit 41 is further configured to set up a ninth bearer associated with the second terminal to the base station, where the ninth bearer is a dedicated bearer, and the second dedicated bearer setup request message is used to request the base station to set up a dedicated bearer associated with the second terminal to the network-side device and set up a dedicated bearer of the second terminal to the second terminal.

Optionally, the network-side device in this embodiment may further include the receiving unit 43, where the receiving unit 43 is configured to receive, before the sending unit 42 sends the second dedicated bearer setup request message to the base station, a bearer resource allocation request message sent by the first terminal and forwarded by the base station, where the bearer resource allocation request message is a bearer resource allocation request message sent by the second terminal and forwarded by the first terminal; and that the sending unit 42 is configured to send a second dedicated bearer setup request message to the base station includes: being configured to send the second dedicated bearer setup request message to the base station according to the bearer resource allocation request message received by the receiving unit 43.

Optionally, the association between the sixth bearer and the second terminal indicates that the identity of the second terminal corresponds to an identity of the sixth bearer.

The network-side device in this embodiment may be configured to execute a technical solution executed by a network-side device in the following method embodiment of the present invention. An implementation principle and a technical effect thereof are similar, and are not described herein.

Figure 5:
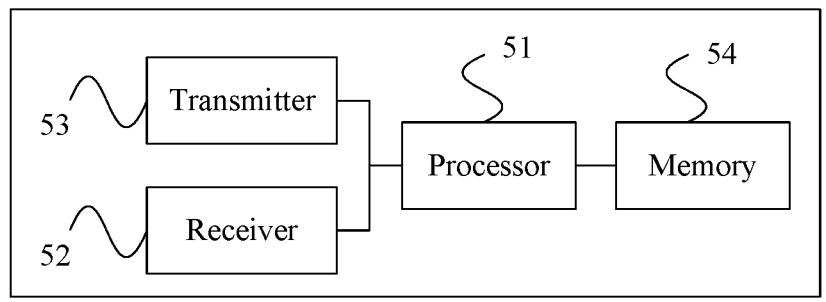
FIG. 5 is a schematic structural diagram of Embodiment 3 of a terminal according to the present invention.

FIG. 5 is a schematic structural diagram of Embodiment 3 of a terminal according to the present invention. As shown in FIG. 5, the terminal in this embodiment serves as a first terminal and may include a processor 51, a receiver 52, a transmitter 53, and a memory 54, where the processor 51 is connected to the receiver 52, the transmitter 53, and the memory 54 respectively. Certainly, the terminal may further include universal components such as an antenna, a baseband processing component, an intermediate radio frequency processing component, and an input/output apparatus, which are not limited in the embodiment of the present invention. The processor 51 may be a central processing unit (CPU for short) or an application-specific integrated circuit (ASIC for short), or is configured as one or more integrated circuits that implement the embodiment of the present invention.

The memory 54 stores a group of program code, and the memory 54 may include a high-speed random access memory (RAM for short), or may further include a non-volatile memory. In addition, the processor 51 invokes the program code stored in the memory 54 to perform the following operations:

setting up a first bearer to a second terminal, where the first terminal serves as a relay device between the second terminal and a base station; receiving, by using the receiver 52 and the first bearer, a service request message sent by the second terminal; forwarding, by using the transmitter 53, to the base station, the service request message received by the receiver 52; receiving, by using the receiver 52, a first service response message sent by the base station; forwarding, by using the transmitter 53, the first service response message to the second terminal by using the first bearer, where the first service response message includes first configuration information, and the first configuration information is configuration information of bearers between the base station and the second terminal; and setting up a second bearer to the second terminal and a third bearer to the base station according to fourth configuration information, where the second bearer and the third bearer serve as the bearers between the second terminal and the base station.

Optionally, that the processor 51 sets up a first bearer to a second terminal includes: the processor 51 sets up the first bearer to the second terminal according to bearer configuration information; or before setting up the first bearer to the second terminal, the processor 51 further sends bearer configuration information to the second terminal by using the transmitter 53; and that the processor 51 sets up a first bearer to a second terminal includes: the processor 51 sets up the first bearer to the second terminal according to the bearer configuration information sent by the transmitter 53.

Optionally, before sending the bearer configuration information to the second terminal by using the transmitter 53, the processor 51 further sets up a fourth bearer to the second terminal according to preset bearer configuration information; and that the processor 51 sends bearer configuration information to the second terminal by using the transmitter 53 includes: the processor 51 sends the bearer configuration information to the second terminal by using the transmitter 53 and the fourth bearer.

Optionally, before sending the bearer configuration information to the second terminal by using the transmitter 53, the processor 51 further sets up a fifth bearer to the base station, and determines the bearer configuration information according to the fifth bearer.

Optionally, before setting up the first bearer to the second terminal, the processor 51 further receives, by using the receiver 52, a relay request message sent by the second terminal, where the relay request message is used to request the first terminal to serve as the relay device between the second terminal and the base station.

Optionally, before setting up the first bearer to the second terminal, the processor 51 further determines that the first terminal has a capability of serving as the relay device between the second terminal and the base station.

Optionally, the fourth configuration information is the first configuration information; or the fourth configuration information is second configuration information, and the processor 51 further receives, by using the receiver 52 and the first bearer, the second configuration information sent by the second terminal, where the second configuration information is determined by the second terminal according to the first configuration information.

Optionally, the first configuration information includes at least one of the following information: RRC layer configuration information, PDCP layer configuration information, RLC layer configuration information, MAC layer configuration information, or PHY layer configuration information; and the second configuration information includes at least one of the following information: the RRC layer configuration information, the PDCP layer configuration information, the RLC layer configuration information, the MAC layer configuration information, or the PHY layer configuration information.

Optionally, that the processor 51 sets up the second bearer to the second terminal according to the second configuration information includes: the processor 51 sets up the second bearer according to the PDCP layer configuration information in the second configuration information, and MAC layer configuration information and PHY layer configuration information that are specified in a short range transmission protocol, where a configuration of a PDCP layer in the second bearer is the same as a configuration of a PDCP layer in the third bearer.

Optionally, the service request message includes at least one of the following information: a relay indication or an identity of the first terminal; and/or the first service response message includes at least one of the following information: a relay indication or an identity of the first terminal; where the relay indication is used to indicate that the second terminal communicates with a network-side device by using the relay device, and the identity of the first terminal is used to indicate that the second terminal communicates with the network-side device through the first terminal corresponding to the identity.

Optionally, after setting up the second bearer to the second terminal and the third bearer to the base station according to the fourth configuration information, the processor 51 further sets up a mapping relationship between the second bearer and the third bearer.

Optionally, the first bearer includes a first signaling radio bearer, the second bearer includes a second signaling radio bearer and a data radio bearer, and the third bearer includes a second signaling radio bearer and a data radio bearer.

Optionally, after setting up the second bearer to the second terminal and the third bearer to the base station according to the fourth configuration information, the processor 51 further receives, by using the receiver 52, a first dedicated bearer setup request message sent by the base station, where the first dedicated bearer setup request message includes third configuration information, and the third configuration information is configuration information of dedicated bearers between the base station and the second terminal; the processor 51 further forwards the first dedicated bearer setup request to the second terminal by using the transmitter 53 and the first bearer or the second bearer; and the processor 51 further sets up a seventh bearer to the second terminal and an eighth bearer to the base station according to the third configuration information, where the seventh bearer and the eighth bearer serve as the dedicated bearers between the second terminal and the base station.

Optionally, that the processor 51 sets up a seventh bearer to the second terminal and an eighth bearer to the base station according to the third configuration information includes: the processor 51 performs, according to the third configuration information, a bearer reconfiguration between the first terminal and the second terminal to set up the seventh bearer, and a bearer reconfiguration between the first terminal and the base station to set up the eighth bearer.

Optionally, before receiving, by using the receiver 52, the dedicated bearer setup request message and the third configuration information sent by the base station, the processor 51 receives, by using the first bearer or the second bearer, a bearer resource allocation request message sent by the second terminal; and the processor 51 further forwards the bearer resource allocation request message to the base station by using the transmitter 53, where the bearer resource allocation request message is used to request allocation of dedicated bearer resources.

Optionally, after setting up the seventh bearer to the second terminal and the eighth bearer to the base station according to the third configuration information, the processor 51 further sets up a mapping relationship between the seventh bearer and the eighth bearer.

The terminal in this embodiment may be configured to execute a technical solution executed by a first terminal in the following method embodiment of the present invention. An implementation principle and a technical effect thereof are similar, and are not described herein.

Figure 6:
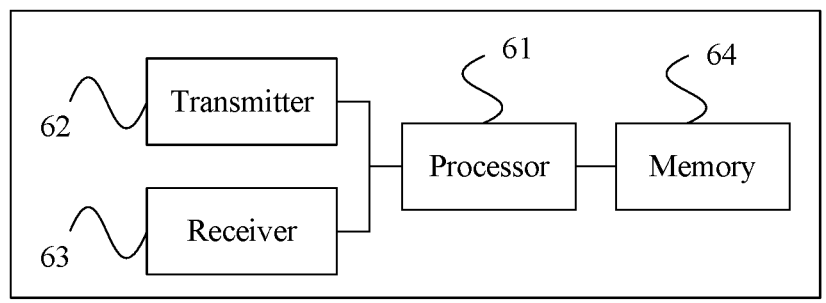
FIG. 6 is a schematic structural diagram of Embodiment 4 of a terminal according to the present invention.

FIG. 6 is a schematic structural diagram of Embodiment 4 of a terminal according to the present invention. As shown in FIG. 6, the terminal in this embodiment serves as a second terminal and may include a processor 61, a transmitter 62, a receiver 63, and a memory 64, where the processor 61 is connected to the transmitter 62, the receiver 63, and the memory 64 respectively. Certainly, the terminal may further include universal components such as an antenna, a baseband processing component, an intermediate radio frequency processing component, and an input/output apparatus, which are not limited in the embodiment of the present invention. The processor 61 may be a CPU, or an ASIC, or is configured as one or more integrated circuits that implement the embodiment of the present invention.

The memory 64 stores a group of program code, and the memory 64 may include a RAM or may further include a non-volatile memory. In addition, the processor 61 is configured to invoke the program code stored in the memory 64 to perform the following operations:

setting up a first bearer to a first terminal, where the first terminal serves as a relay device between the second terminal and a base station; sending, by using the transmitter 62, a service request message to the first terminal by using the first bearer, so that the first terminal forwards the service request message to the base station; and receiving, by using the receiver 63 and the first bearer, a first service response message sent by the base station and forwarded by the first terminal, where the first service response message includes first configuration information, and the first configuration information is configuration information of bearers between the base station and the second terminal; and setting up a second bearer to the first terminal according to the first configuration information.

Optionally, that the processor 61 sets up a first bearer to a first terminal includes: the processor 61 sets up the first bearer to the first terminal according to bearer configuration information; or before setting up the first bearer to the first terminal, the processor 61 receives, by using the receiver 63, bearer configuration information sent by the first terminal; and that the processor 61 sets up a first bearer to a first terminal includes: the processor 61 sets up the first bearer to the first terminal according to the bearer configuration information received by the receiver 63.

Optionally, before receiving, by using the receiver 63, the bearer configuration information sent by the first terminal, the processor 61 further sets up a fourth bearer to the first terminal according to preset bearer configuration information; and that the processor 61 receives, by using the receiver 63, bearer configuration information sent by the first terminal includes: the processor 61 receives, by using the receiver 63 and the fourth bearer, the bearer configuration information sent by the first terminal.

Optionally, before setting up the first bearer to the first terminal, the processor 61 further sends a relay request message to the first terminal by using the transmitter 62, where the relay request message is used to request the first terminal to serve as the relay device between the second terminal and the base station.

Optionally, that the processor 61 sets up a second bearer to the first terminal according to the first configuration information includes: the processor 61 sets up the second bearer to the first terminal according to the first configuration information; and sends second configuration information to the first terminal by using the transmitter 62, where the second configuration information instructs the first terminal to set up the second bearer to the second terminal and set up the third bearer to the base station, and the second configuration information is information determined by the processor 61 according to the first configuration information.

Optionally, the first configuration information includes at least one of the following information: RRC layer configuration information, PDCP layer configuration information, RLC layer configuration information, MAC layer configuration information, or PHY layer configuration information; and the second configuration information includes at least one of the following information: the RRC layer configuration information, the PDCP layer configuration information, the RLC layer configuration information, the MAC layer configuration information, or the PHY layer configuration information.

Optionally, that the processor 61 sets up the second bearer to the first terminal according to the first configuration information includes: the processor 61 sets up the second bearer to the first terminal according to the PDCP layer configuration information in the first configuration information, and MAC layer configuration information and PHY layer configuration information that are specified in a short range transmission protocol, where a configuration of a PDCP layer in the second bearer is the same as a configuration of a PDCP layer in the third bearer.

Optionally, the service request message includes at least one of the following information: a relay indication or an identity of the first terminal; and/or the first service response message includes at least one of the following information: a relay indication or an identity of the first terminal; where the relay indication is used to indicate that the second terminal communicates with a network-side device by using the relay device, and the identity of the first terminal is used to indicate that the second terminal communicates with the network-side device through the first terminal corresponding to the identity.

Optionally, the first bearer includes a first signaling radio bearer, and the second bearer includes a second signaling radio bearer and a data radio bearer.

Optionally, after setting up the second bearer to the first terminal according to the first configuration information, the processor 61 receives, by using the receiver 63 and the second bearer and/or the first bearer, a first dedicated bearer setup request message sent by the base station and forwarded by the first terminal, where the first dedicated bearer setup request message includes third configuration information, and the third configuration information is configuration information of dedicated bearers between the base station and the second terminal; and the processor 61 further sets up a seventh bearer to the first terminal according to the third configuration information.

Optionally, that the processor 61 sets up a seventh bearer to the first terminal according to the third configuration information includes: performing a bearer reconfiguration between the second terminal and the first terminal according to the third configuration information to set up the seventh bearer.

Optionally, before receiving, by using the receiver 63 and the second bearer, the dedicated bearer setup request message and the third configuration information sent by the base station and forwarded by the first terminal, the processor 61 sends a bearer resource allocation request message to the first terminal by using the transmitter 62 and the first bearer or the second bearer, so that the first terminal forwards the bearer resource allocation request message to the base station by using the third bearer, where the bearer resource allocation request message is used to request allocation of dedicated bearer resources.

The terminal in this embodiment may be configured to execute a technical solution executed by a second terminal in the following method embodiment of the present invention. An implementation principle and a technical effect thereof are similar, and are not described herein.

Figure 7:
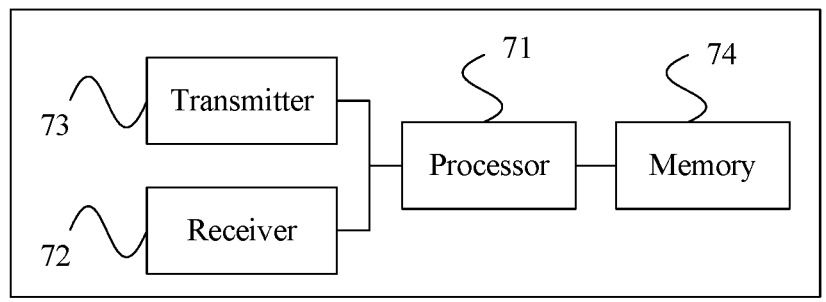
FIG. 7 is a schematic structural diagram of Embodiment 2 of a base station according to the present invention.

FIG. 7 is a schematic structural diagram of Embodiment 2 of a base station according to the present invention. As shown in FIG. 7, the base station in this embodiment may include a processor 71, a receiver 72, a transmitter 73, and a memory 74, where the processor 71 is connected to the receiver 72, the transmitter 73, and the memory 74 respectively. Certainly, the base station may further include universal components such as an antenna, a baseband processing component, an intermediate radio frequency processing component, and an input/output apparatus, which are not limited in the embodiment of the present invention. The processor 71 may be a CPU, or an ASIC, or is configured as one or more integrated circuits that implement the embodiment of the present invention. The memory 74 stores a group of program code, and the memory 74 may include a RAM or may further include a non-volatile memory. In addition, the processor 71 is configured to invoke the program code stored in the memory 74 to perform the following operations:

receiving, according to a service request message, by using the receiver 72, a second service response message and indication information sent by a network-side device, where the service request message is a service request message sent by a second terminal through a first terminal, the indication information is used to determine first configuration information, and the first configuration information is configuration information of bearers between the base station and the second terminal; setting up, according to the indication information, a sixth bearer associated with the second terminal to the network-side device; determining the first configuration information according to the indication information; setting up a third bearer to the first terminal according to the first configuration information; and sending, according to the second service response message, by using the transmitter 73, a first service response message to the second terminal through the first terminal, where the first service response message includes the first configuration information.

Optionally, before receiving, according to the service request message, by using the receiver 72, the second service response message and the indication information sent by the network-side device, the processor 71 sets up, according to the service request message, a connection associated with the second terminal to the network-side device; and that the processor 71 sets up, according to the indication information, a sixth bearer associated with the second terminal to the network-side device includes: the processor 71 sets up, by receiving the second service response message and the indication information over the connection by using the receiver 72, the sixth bearer associated with the second terminal to the network-side device.

Optionally, before receiving, according to the service request message, by using the receiver 72, the second service response message and the indication information sent by the network-side device, the processor 71 sets up, according to the service request message, a connection associated with the first terminal to the network-side device; and that the processor 71 sets up, according to the indication information, a sixth bearer associated with the second terminal to the network-side device includes: the processor 71 sets up, by receiving the second service response message and the indication information over the connection by using the receiver 72 the sixth bearer associated with the second terminal to the network-side device, where the indication information is further used to indicate an identity of the second terminal.

Optionally, that the processor 71 sets up the sixth bearer associated with the second terminal to the network-side device includes: the processor 71 changes a bearer between the base station and the network-side device from associating with the first terminal to associating with the second terminal.

Optionally, the service request message includes at least one of the following information: a relay indication or an identity of the first terminal; and/or the first service response message includes at least one of the following information: a relay indication or an identity of the first terminal; where the relay indication is used to indicate that the second terminal communicates with the network-side device by using a relay device, and the identity of the first terminal is used to indicate that the second terminal communicates with the network-side device through the first terminal corresponding to the identity.

Optionally, after setting up the third bearer to the first terminal according to the first configuration information, the processor 71 further sets up a mapping relationship between the sixth bearer and the third bearer.

Optionally, the sixth bearer includes an S1 bearer, and the third bearer includes a second signaling radio bearer and a data radio bearer.

Optionally, after setting up the third bearer to the first terminal according to the first configuration information, the processor 71 further receives, by using the receiver 72, a second dedicated bearer setup request message sent by the network-side device; the processor 71 further sets up, according to the second dedicated bearer setup request message, a ninth bearer associated with the second terminal to the network-side device, where the ninth bearer is a dedicated bearer, and the second dedicated bearer setup request message is used to request the base station to set up a dedicated bearer associated with the second terminal to the network-side device and set up a dedicated bearer of the second terminal to the second terminal; the processor 71 determines third configuration information according to the second dedicated bearer setup request message, where the third configuration information is configuration information of dedicated bearers between the base station and the second terminal; and sets up an eighth bearer to the first terminal according to the third configuration information; and the processor 71 further sends, by using the transmitter 73, a first dedicated bearer setup request message to the first terminal according to the second dedicated bearer setup request message, where the first dedicated bearer setup request message includes the third configuration information, so that the first terminal forwards the first dedicated bearer setup request message to the second terminal by using the second bearer and/or the first bearer, and that the first terminal sets up a seventh bearer to the second terminal according to the third configuration information, where the seventh bearer and the eighth bearer serve as the dedicated bearers between the second terminal and the base station.

Optionally, that the processor 71 sets up an eighth bearer to the first terminal according to the third configuration information includes: the processor 71 performs a bearer reconfiguration between the base station and the first terminal according to the third configuration information to set up the eighth bearer.

Optionally, before receiving, by using the receiver 72, the second dedicated bearer setup request message sent by the network-side device, the processor 71 further receives a bearer resource allocation request message sent by the second terminal and forwarded by the first terminal, where the bearer resource allocation request message is used to request allocation of dedicated bearer resources; and the processor 71 further forwards the bearer resource allocation request message to the network-side device by using the transmitter 73.

Optionally, after setting up the eighth bearer to the first terminal according to the third configuration information, the processor 71 further sets up a mapping relationship between the eighth bearer and the ninth bearer.

Optionally, the association between the sixth bearer and the second terminal indicates that the identity of the second terminal corresponds to an identity of the sixth bearer.

The base station in this embodiment may be configured to execute a technical solution executed by a base station in the following method embodiment of the present invention. An implementation principle and a technical effect thereof are similar, and are not described herein.

Figure 8:
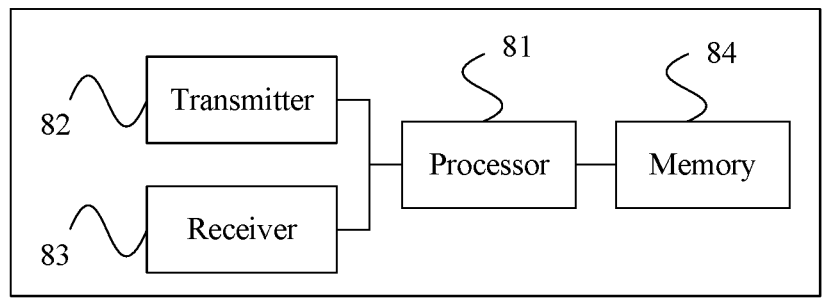
FIG. 8 is a schematic structural diagram of Embodiment 2 of a network-side device according to the present invention.

FIG. 8 is a schematic structural diagram of Embodiment 2 of a network-side device according to the present invention. As shown in FIG. 8, the network-side device in this embodiment may include a processor 81, a transmitter 82, a receiver 83, and a memory 84, where the processor 81 is connected to the transmitter 82, the receiver 83, and the memory 84 respectively. The processor 81 may be a CPU, or an ASIC, or is configured as one or more integrated circuits that implement the embodiment of the present invention. The memory 84 stores a group of program code, and the memory 84 may include a RAM or may further include a non-volatile memory. In addition, the processor 81 is configured to invoke the program code stored in the memory 84 to perform the following operations:

receiving, by using the receiver 83, a service request message, where the service request message is a service request message sent by a second terminal through a first terminal and a base station; sending, by using the transmitter 82, a second service response message and indication information to the base station, where the indication information is used to determine first configuration information, and the first configuration information is configuration information of bearers between the base station and the second terminal; and setting up, according to the service request message, a sixth bearer associated with the second terminal to the base station.

Optionally, before sending the second service response message and the indication information to the base station by using the transmitter 82, the processor 81 further sets up, according to the service request message, a connection associated with the second terminal to the base station; and that the processor 81 sets up, according to the service request message, a sixth bearer associated with the second terminal to the base station includes: the processor 81 sets up, according to the service request message, by sending the second service response message and the indication information over the connection by using the transmitter 82, the sixth bearer associated with the second terminal to the base station.

Optionally, before sending the second service response message and the indication information to the base station by using the transmitter 82, the processor 81 is further configured to set up, according to the service request message, a connection associated with the first terminal to the base station; and that the processor 81 sets up, according to the service request message, a sixth bearer associated with the second terminal to the base station includes: being configured to set up, according to the service request message, by sending the second service response message and the indication information over the connection by using the transmitter 82, the sixth bearer associated with the second terminal to the base station, where the indication information is further used to indicate an identity of the second terminal.

Optionally, that the processor 81 sets up the sixth bearer associated with the second terminal to the base station includes: the processor 81 changes a bearer between the network-side device and the base station from associating with the first terminal to associating with the second terminal.

Optionally, the sixth bearer includes an S1 bearer.

Optionally, the service request message includes at least one of the following information: a relay indication or an identity of the first terminal; and/or the second service response message includes at least one of the following information: a relay indication or an identity of the first terminal; where the relay indication is used to indicate that the second terminal communicates with the network-side device by using a relay device, and the identity of the first terminal is used to indicate that the second terminal communicates with the network-side device through the first terminal corresponding to the identity.

Optionally, after sending the second service response message and the indication information to the base station by using the transmitter 82, the processor 81 further sends a second dedicated bearer setup request message to the base station; and the processor 81 further sets up a ninth bearer associated with the second terminal to the base station, where the ninth bearer is a dedicated bearer, and the second dedicated bearer setup request message is used to request the base station to set up a dedicated bearer associated with the second terminal to the network-side device and set up a dedicated bearer of the second terminal to the second terminal.

Optionally, the network-side device in this embodiment may further include the receiver 83, where before sending the second dedicated bearer setup request message to the base station by using the transmitter 82, the processor 81 further receives, by using the receiver 83, a bearer resource allocation request message sent by the first terminal and forwarded by the base station, where the bearer resource allocation request message is a bearer resource allocation request message sent by the second terminal and forwarded by the first terminal; and that the processor 81 sends a second dedicated bearer setup request message to the base station by using the transmitter 82 includes: the processor 81 sends, by using the transmitter 82, the second dedicated bearer setup request message to the base station according to the bearer resource allocation request message.

Optionally, the association between the sixth bearer and the second terminal indicates that the identity of the second terminal corresponds to an identity of the sixth bearer.

The network-side device in this embodiment may be configured to execute a technical solution executed by a network-side device in the following method embodiment of the present invention. An implementation principle and a technical effect thereof are similar, and are not described herein.

Figure 9:
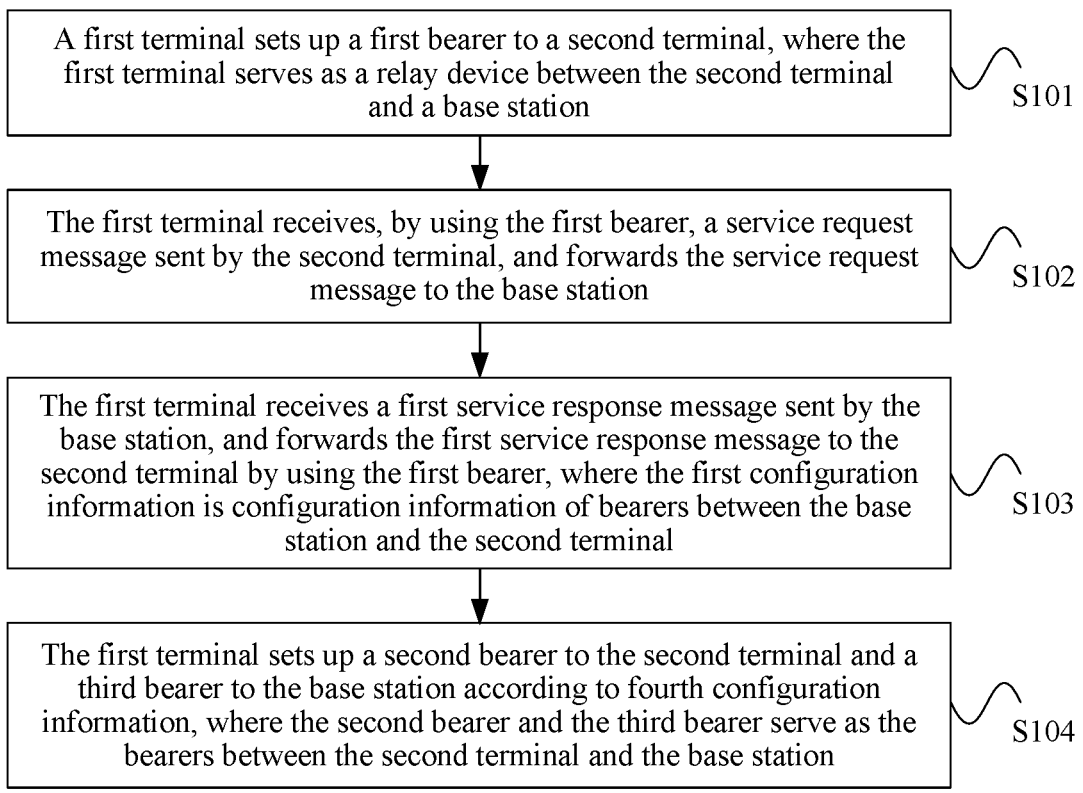
FIG. 9 is a flowchart of Embodiment 1 of a relay implementation method according to the present invention.

FIG. 9 is a flowchart of Embodiment 1 of a relay implementation method according to the present invention. As shown in FIG. 9, this embodiment is executed by a first terminal, and the method in this embodiment may include:

S101. A first terminal sets up a first bearer to a second terminal, where the first terminal serves as a relay device between the second terminal and a base station.

This embodiment is to implement use of the first terminal as a relay device for the second terminal, so that the first terminal is configured to forward signaling or data transmitted between the second terminal and the base station or a network side. Therefore, first, the first terminal sets up the first bearer to the second terminal. The first bearer may include a first signaling radio bearer. The first signaling radio bearer may be, for example, an SRB1, where the SRB1 is used to transmit an RRC message and a NAS message on a DCCH.

S102. The first terminal receives, by using the first bearer, a service request message sent by the second terminal, and forwards the service request message to the base station.

In this embodiment, the second terminal sends the service request message to the first terminal by using the first bearer that is set up to the first terminal. The service request message may be, for example, a registration request (Attach Request), a connection setup request (PDN CONNECTIVITY REQUEST), a service request (Service Request), or a tracking area update request (TAU request), which is not limited in the embodiment of the present invention. After receiving the service request message, the first terminal forwards the service request message to the base station by using the bearer (for example, an SRB1 between the first terminal and the base station) between the first terminal and the base station. Then the base station forwards the service request message to a network-side device. The service request message may indicate that the service request message is sent by the second terminal.

It should be noted that, during forwarding, content of the forwarded message is the same, but protocols may be different and processing may be required. Using service request message forwarding as an example for description, the service request message sent by the second terminal and received by the first terminal is to an M2M control command, and the service request message sent by the first terminal to the base station belongs to an RRC command.

S103. The first terminal receives a first service response message sent by the base station, and forwards the first service response message to the second terminal by using the first bearer, where the first configuration information is configuration information of bearers between the base station and the second terminal.

In this embodiment, after receiving the service request message forwarded by the base station, the network-side device sets up, according to the service request message, a bearer associated with the second terminal to the base station, where the bearer is referred to as a sixth bearer. The sixth bearer may include an S1 bearer, and the S1 bearer is a bearer on an S1 interface. The S1 interface is an interface between the base station and an MME or an SGW, and includes two interfaces: one is an S1-connection between the base station and the mobility management entity (MME for short), and the other is an S1-GW between the base station and the SGW. The S1 bearer is used to transmit user plane data. The bearer associated with the second terminal indicates that the bearer is used to carry data transmitted between the second terminal and the network-side device. In addition, the network-side device further sends a second service response message to the base station according to the service request message, where the second service response message is used to respond to the service request message, and the second service response message is, for example, a registration response (Attach Accept), a connection setup response (PDN CONNECTIVITY Accept), a service response (Service Accept), or a tracking area update response (TAU Accept). In addition, the network-side device further sends indication information to the base station, where the indication information is used to determine configuration information of bearers between the base station and the second terminal, the bearers include, for example, an SRB2 and a DRB between the base station and the second terminal, the configuration information is referred to as first configuration information, and the indication information includes, for example, QoS. The base station determines the first configuration information according to the indication information. Then the base station sends the first service response message to the first terminal according to the second service response message, where the first service response message may further include the second service response message. The first terminal forwards the first service response message to the second terminal by using the first bearer that is set up to the second terminal.

S104. The first terminal sets up a second bearer to the second terminal and a third bearer to the base station according to fourth configuration information, where the second bearer and the third bearer serve as the bearers between the second terminal and the base station.

In this embodiment, after sending the first service response message, the first terminal sets up the second bearer to the second terminal according to the fourth configuration information, where the second bearer includes a second signaling radio bearer and a DRB, and the second signaling radio bearer is, for example, an SRB2. After the second terminal sets up the second bearer to the first terminal, the first terminal sets up the third bearer to the base station according to the fourth configuration information, where the third bearer includes a second signaling radio bearer and a DRB, and the second signaling radio bearer is, for example, an SRB2. Therefore, bearers between the second terminal and the base station are set up, where the second bearer and the third bearer serve as the bearers between the second terminal and the base station. Therefore, a channel between the second terminal and the network-side device is set up successfully. The second terminal and the network-side device may transmit information by using the second bearer, the third bearer, and the sixth bearer, and the first terminal serves as the relay device to forward information transmitted between the second terminal and the base station to the second terminal and the base station respectively.

Optionally, the fourth configuration information may be the foregoing first configuration information, or the fourth configuration information may be second configuration information, where the second configuration information is configuration information sent by the second terminal according to the first configuration information.

In this embodiment, a first terminal sets up a first bearer to a second terminal, and receives, by using the first bearer, a service request message sent by the second terminal, and then forwards the service request message to a base station, so that the base station sets up, according to the service request message, a bearer associated with the second terminal to a network-side device; then the first terminal receives a first service response message sent by the base station, and forwards the first service response message to the second terminal; then the first terminal sets up a bearer to the second terminal and a bearer to the base station respectively according to fourth configuration information. Therefore, the second terminal and the base station set up bearers between the second terminal and the base station through the first terminal, and also set up an information transmission channel between the second terminal and the network-side device. Therefore, a process of setting up a bearer between the second terminal and the network-side device is implemented, and further, a process in which a terminal serves as a relay device between another terminal and the base station is implemented, network deployment costs may be reduced, and network complexity may be reduced.

Figure 10:
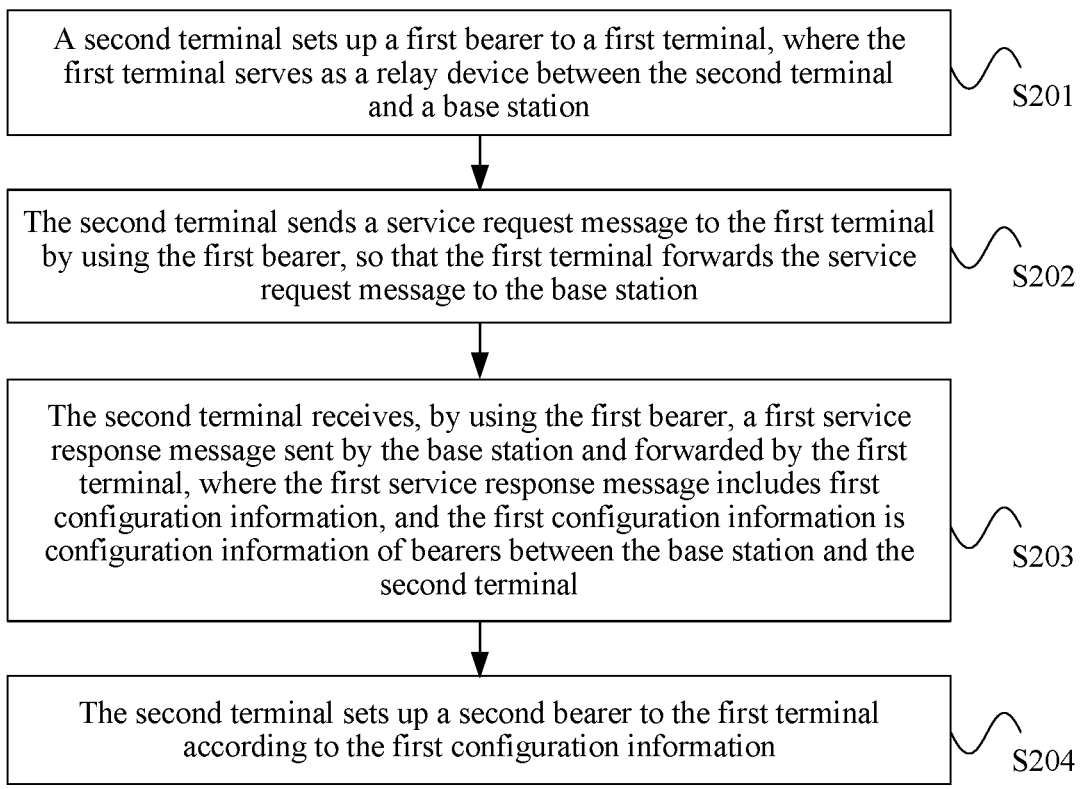
FIG. 10 is a flowchart of Embodiment 2 of a relay implementation method according to the present invention.

FIG. 10 is a flowchart of Embodiment 2 of a relay implementation method according to the present invention. As shown in FIG. 10, this embodiment is executed by a second terminal, and the method in this embodiment may include:

S201. A second terminal sets up a first bearer to a first terminal, where the first terminal serves as a relay device between the second terminal and a base station.

This embodiment is to implement use of the first terminal as a relay device for the second terminal, so that the first terminal is configured to forward signaling or data transmitted between the second terminal and the base station or a network side. Therefore, first, the second terminal sets up the first bearer to the first terminal. The first bearer includes a first signaling radio bearer, where the first signaling radio bearer is a signaling radio bearer 1 (SRB1 for short), and the SRB1 is used to transmit a radio resource control (RRC for short) message and a non-access stratum (NAS for short) message on a dedicated control channel (DCCH for short).

S202. The second terminal sends a service request message to the first terminal by using the first bearer, so that the first terminal forwards the service request message to the base station.

In this embodiment, the second terminal sends the service request message to the first terminal by using the first bearer that is set up to the first terminal. The service request message may be, for example, a registration request (Attach Request), a connection setup request (PDN CONNECTIVITY REQUEST), a service request (Service Request), or a tracking area update request (TAU request), which is not limited in the embodiment of the present invention. After receiving the service request message, the first terminal may forward the service request message to the base station by using the bearer (for example, an SRB1 between the first terminal and the base station) between the first terminal and the base station. Then the base station forwards the service request message to a network-side device. The service request message may indicate that the service request message is sent by the second terminal.

S203. The second terminal receives, by using the first bearer, a first service response message sent by the base station and forwarded by the first terminal, where the first service response message includes first configuration information, and the first configuration information is configuration information of bearers between the base station and the second terminal.

In this embodiment, after receiving the service request message forwarded by the base station, the network-side device sets up, according to the service request message, a bearer associated with the second terminal to the base station, where the bearer is referred to as a sixth bearer. The sixth bearer includes, for example, an S1 bearer, and the S1 bearer is a bearer on an S1 interface. The S1 bearer is used to transmit user plane data. The bearer associated with the second terminal indicates that the bearer is used to carry data transmitted between the second terminal and the network-side device. In addition, the network-side device further sends a second service response message to the base station according to the service request message, where the second service response message is used to respond to the service request message, and the second service response message is, for example, a registration response (Attach Accept), a connection setup response (PDN CONNECTIVITY Accept), a service response (Service Accept), or a tracking area update response (TAU Accept). In addition, the network-side device further sends indication information to the base station, where the indication information is used to determine configuration information of bearers between the base station and the second terminal, the bearers include, for example, an SRB2 and a data radio bearer (DRB) between the base station and the second terminal, the configuration information is referred to as first configuration information, and the indication information includes, for example, quality of service (QoS). The base station determines the first configuration information according to the indication information. Then the base station sends the first service response message to the first terminal according to the second service response message, where the first service response message may further include the second service response message. The first terminal forwards the first service response message to the second terminal by using the first bearer that is set up to the second terminal.

S204. The second terminal sets up a second bearer to the first terminal according to the first configuration information.

In this embodiment, after receiving the first service response message, the second terminal knows that the service request has obtained permission of the network-side device, for example, may know, according to the second service response message, that the service request has obtained permission of the network-side device. The second terminal sets up the second bearer to the first terminal according to the first configuration information, where the second bearer includes a second signaling radio bearer and a DRB, and the second signaling radio bearer is, for example, an SRB2. The first terminal may further set up a third bearer to the base station according to the first configuration information, where the third bearer includes a second signaling radio bearer and a DRB, and the second signaling radio bearer is, for example, an SRB2. Therefore, bearers between the second terminal and the base station are set up, where the second bearer and the third bearer serve as the bearers between the second terminal and the base station. Therefore, a channel between the second terminal and the network-side device through the first terminal is set up successfully. The second terminal and the network-side device may transmit information by using the second bearer, the third bearer, and the sixth bearer, and the first terminal serves as the relay device to forward information transmitted between the second terminal and the base station to the second terminal and the base station respectively. It should be noted that, the SRB2 is used for a NAS message, and the DRB is used to transmit user plane data.

In this embodiment, a second terminal sets up a first bearer to a first terminal, and sends a service request message to the first terminal by using the first bearer, so that the first terminal forwards the service request message to the base station, and that the base station sets up, according to the service request message, a bearer associated with the second terminal to a network-side device; then the second terminal receives, by using the first bearer, a first service response message sent by the base station and forwarded by the first terminal; and then the second terminal sets up a bearer between the second terminal and the base station to the base station through the first terminal. Therefore, a process of setting up a bearer between the second terminal and the network-side device is implemented, and further, a process in which a terminal serves as a relay device between another terminal and the base station is implemented, network deployment costs may be reduced, and network complexity may be reduced.

Figure 11:
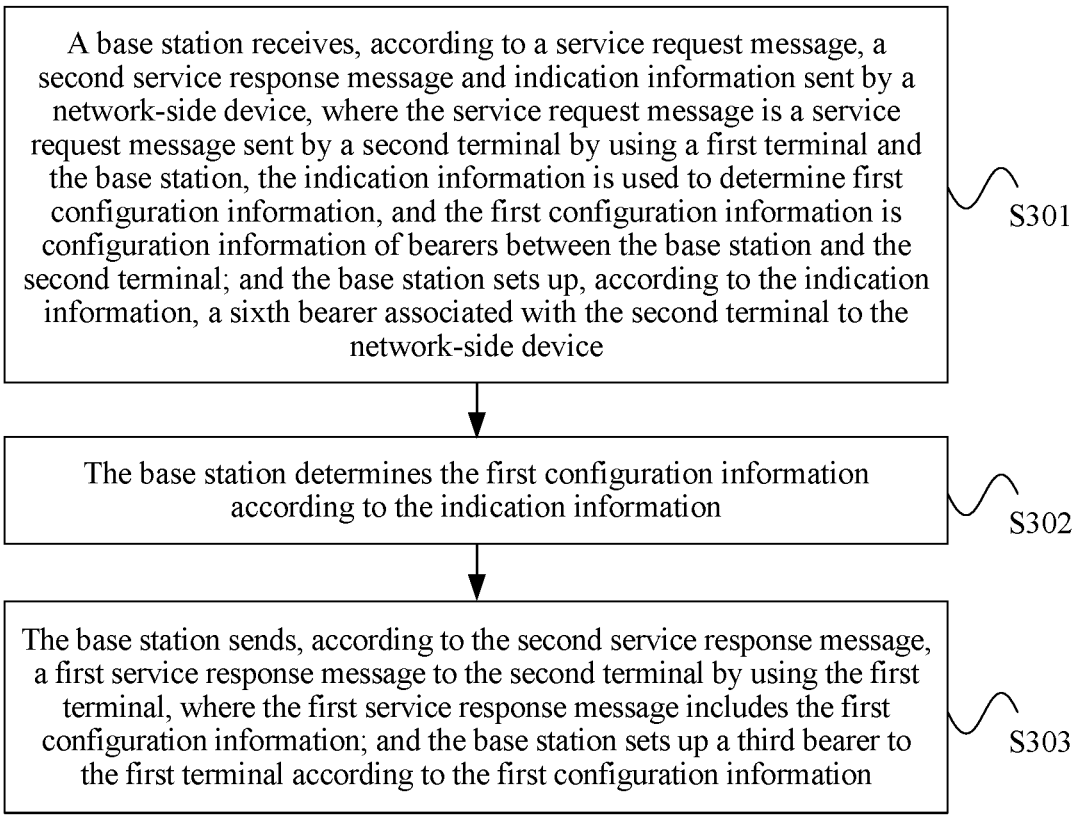
FIG. 11 is a flowchart of Embodiment 3 of a relay implementation method according to the present invention.

FIG. 11 is a flowchart of Embodiment 3 of a relay implementation method according to the present invention. As shown in FIG. 11, this embodiment is executed by a base station, and the method in this embodiment may include:

S301. A base station receives, according to a service request message, a second service response message and indication information sent by a network-side device, where the service request message is a service request message sent by a second terminal through a first terminal and the base station, the indication information is used to determine first configuration information, and the first configuration information is configuration information of bearers between the base station and the second terminal; and the base station sets up, according to the indication information, a sixth bearer associated with the second terminal to the network-side device.

This embodiment is to implement use of the first terminal as a relay device for the second terminal, so that the first terminal forwards signaling or data transmitted between the second terminal and the base station or a network side. Therefore, first, the second terminal sets up a first bearer to the first terminal. The first bearer includes a first signaling radio bearer, where the first signaling radio bearer is, for example, an SRB1.

In this embodiment, the second terminal sends the service request message to the first terminal by using the first bearer that is set up to the first terminal. The service request message may be, for example, a registration request (Attach Request), a connection setup request (PDN CONNECTIVITY REQUEST), a service request (Service Request), or a tracking area update request (TAU request), which is not limited in the embodiment of the present invention. After receiving the service request message, the first terminal forwards the service request message to the base station by using the bearer (for example, an SRB1 between the first terminal and the base station) between the first terminal and the base station. Then the base station forwards the service request message to the network-side device. The service request message may indicate that the service request message is sent by the second terminal.

In this embodiment, after the network-side device receives the service request message forwarded by the base station, the base station receives the second service response message and the indication information that are sent by the network-side device according to the service request message, and sets up, according to the indication information, a bearer associated with the second terminal to the network-side device, where the bearer is referred to as the sixth bearer. The sixth bearer includes an S1 bearer, and the S1 bearer is a bearer on an S1 interface. The S1 bearer may be used to transmit user plane data. The bearer associated with the second terminal indicates that the bearer is used to carry information transmitted between the second terminal and the network-side device. The second service response message is used to respond to the service request message, and the second service response message is, for example, a registration response (Attach Accept), a connection setup response (PDN CONNECTIVITY Accept), a service response (Service Accept), or a tracking area update response (TAU Accept). In addition, the base station further receives indication information sent by the network-side device, where the indication information is used to determine configuration information of bearers between the base station and the second terminal, the bearers include, for example, an SRB2 and a DRB between the base station and the second terminal, the configuration information is referred to as first configuration information, and the indication information includes, for example, QoS. Optionally, the indication information is further used to indicate configuration information of the sixth bearer between the base station and the network-side device. It should be noted that, there is no limitation on an execution sequence in which the base station sets up the bearer associated with the second terminal to the network-side device, and the base station sets up a third bearer to the second terminal.

S302. The base station determines the first configuration information according to the indication information.

S303. The base station sends, according to the second service response message, a first service response message to the second terminal through the first terminal, where the first service response message includes the first configuration information; and the base station sets up a third bearer to the first terminal according to the first configuration information.

In this embodiment, the base station determines the first configuration information according to the indication information, and then the base station sends the first service response message to the first terminal according to the second service response message, where the second service response message may further include the second service response message. Then the first terminal forwards the service response message and the first configuration information to the second terminal by using the first bearer that is set up to the second terminal. Therefore, the first terminal sets up a second bearer to the second terminal according to the first configuration information, where the second bearer includes a second signaling radio bearer and a DRB, and the second signaling radio bearer is, for example, an SRB2. The first terminal may further set up the third bearer to the base station according to the first configuration information, where the third bearer includes a second signaling radio bearer and a DRB, and the second signaling radio bearer is, for example, an SRB2. Therefore, bearers between the second terminal and the base station are set up, where the second bearer and the third bearer serve as the bearers between the second terminal and the base station. Therefore, a channel between the second terminal and the network-side device is set up successfully. The second terminal and the network-side device transmit information by using the second bearer, the third bearer, and the sixth bearer, and the first terminal serves as the relay device to forward information transmitted between the second terminal and the base station to the second terminal and the base station respectively.

In this embodiment, a base station receives, according to a service request message, a second service response message and indication information sent by a network-side device, where the service request message is a service request message sent by a second terminal through a first terminal, and sets up, according to the indication information, a bearer associated with the second terminal to the network-side device; and then determines first configuration information according to the indication information, and further sends, according to the second service response message, a first service response message to the second terminal through the first terminal. The second terminal sets up a bearer between the second terminal and the base station to the base station through the first terminal. Therefore, a process of setting up a bearer between the second terminal and the network-side device is implemented, and further, a process in which a terminal serves as a relay device between another terminal and the base station is implemented, network deployment costs may be reduced, and network complexity may be reduced.

Figure 12:
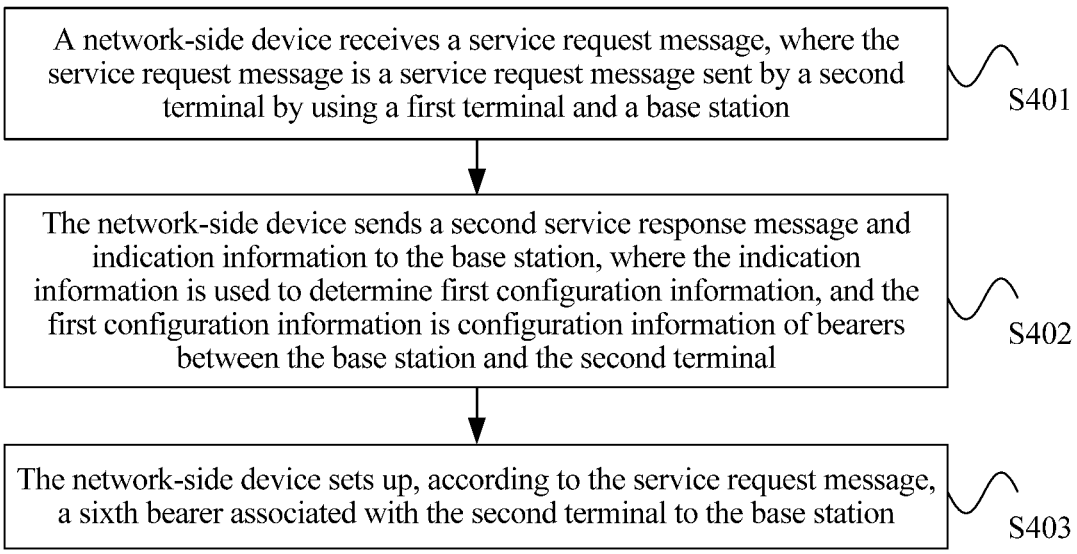
FIG. 12 is a flowchart of Embodiment 4 of a relay implementation method according to the present invention.

FIG. 12 is a flowchart of Embodiment 4 of a relay implementation method according to the present invention. As shown in FIG. 12, this embodiment is executed by a network-side device, and the method in this embodiment may include:

S401. A network-side device receives a service request message, where the service request message is a service request message sent by a second terminal through a first terminal and a base station.

S402. The network-side device sends a second service response message and indication information to the base station, where the indication information is used to determine first configuration information, and the first configuration information is configuration information of bearers between the base station and the second terminal.

S403. The network-side device sets up, according to the service request message, a sixth bearer associated with the second terminal to the base station.

This embodiment is to implement use of the first terminal as a relay device for the second terminal, so that the first terminal is configured to forward signaling or data transmitted between the second terminal and the base station or a network side. Therefore, first, the second terminal sets up a first bearer to the first terminal. The first bearer includes a first signaling radio bearer, where the first signaling radio bearer is, for example, an SRB1.

In this embodiment, the second terminal sends the service request message to the first terminal by using the first bearer that is set up to the first terminal. The service request message may be, for example, a registration request (Attach Request), a connection setup request (PDN CONNECTIVITY REQUEST), a service request (Service Request), or a tracking area update request (TAU request), which is not limited in the embodiment of the present invention. After receiving the service request message, the first terminal forwards the service request message to the base station by using the bearer (for example, an SRB1 between the first terminal and the base station) between the first terminal and the base station. Then the base station forwards the service request message to the network-side device. The service request message may indicate that the service request message is sent by the second terminal.

In this embodiment, after the network-side device receives the service request message sent by the base station, the network-side device further sends the second service response message to the base station according to the service request message, where the second service response message is used to respond to the service request message, and the second service response message is, for example, a registration response (Attach Accept), a connection setup response (PDN CONNECTIVITY Accept), a service response (Service Accept), or a tracking area update response (TAU Accept). In addition, the network-side device further sends indication information to the base station, where the indication information is used to determine configuration information of bearers between the base station and the second terminal, the bearers include, for example, an SRB2 and a DRB between the base station and the second terminal, the configuration information is referred to as the first configuration information, and the indication information includes, for example, QoS. The network-side device may further set up, according to the service request message, a bearer associated with the second terminal to the base station, where the bearer is referred to as the sixth bearer. The sixth bearer may be, for example, an S1 bearer, and the S1 bearer is a bearer on an S1 interface. The bearer associated with the second terminal indicates that the bearer is used to carry information transmitted between the second terminal and the network-side device. The base station receives the second service response message and the indication information sent by the network-side device, and sets up a bearer associated with the second terminal to the network-side device. The base station may further determine the first configuration information according to the indication information, and then the base station sends, according to the second service response message, a first service response message to the second terminal through the first terminal, where the first service response message may further include the second service response message. The first terminal forwards the first service response message to the second terminal by using the first bearer that is set up to the second terminal. Then the first terminal sets up a second bearer to the second terminal according to the first configuration information, where the second bearer includes a second signaling radio bearer and a DRB, and the second signaling radio bearer is, for example, an SRB2 and a DRB. The first terminal may further set up a third bearer to the base station according to the first configuration information, where the third bearer includes a second signaling radio bearer and a DRB, and the second signaling radio bearer is, for example, an SRB2. Therefore, bearers between the second terminal and the base station are set up, where the second bearer and the third bearer serve as the bearers between the second terminal and the base station. Therefore, a channel between the second terminal and the network-side device is set up successfully. The second terminal and the network-side device may transmit information by using the second bearer, the third bearer, and the sixth bearer, and the first terminal serves as the relay device to forward information transmitted between the second terminal and the base station to the second terminal and the base station respectively.

It should be noted that, there is no limitation on an execution sequence in which the network-side device sends the second service response message and the indication information to the base station, and the network-side device sets up, according to the service request message, the sixth bearer associated with the second terminal to the base station.

In this embodiment, a network-side device receives a service request message, where the service request message is a service request message sent by a second terminal through a first terminal and a base station, sends a second service response message and indication information to the base station, where the indication information is used to determine first configuration information, and sets up, according to the service request message, a sixth bearer associated with the second terminal to the base station. Therefore, the base station determines the first configuration information according to the indication information, and further sends, according to the second service response message, a first service response message including the first configuration information to the second terminal through the first terminal. The second terminal sets up a bearer between the second terminal and the base station to the base station through the first terminal. Therefore, a process of setting up a bearer between the second terminal and the network-side device is implemented, and further, a process in which a terminal serves as a relay device between another terminal and the base station is implemented, network deployment costs may be reduced, and network complexity may be reduced.

Figure 13:
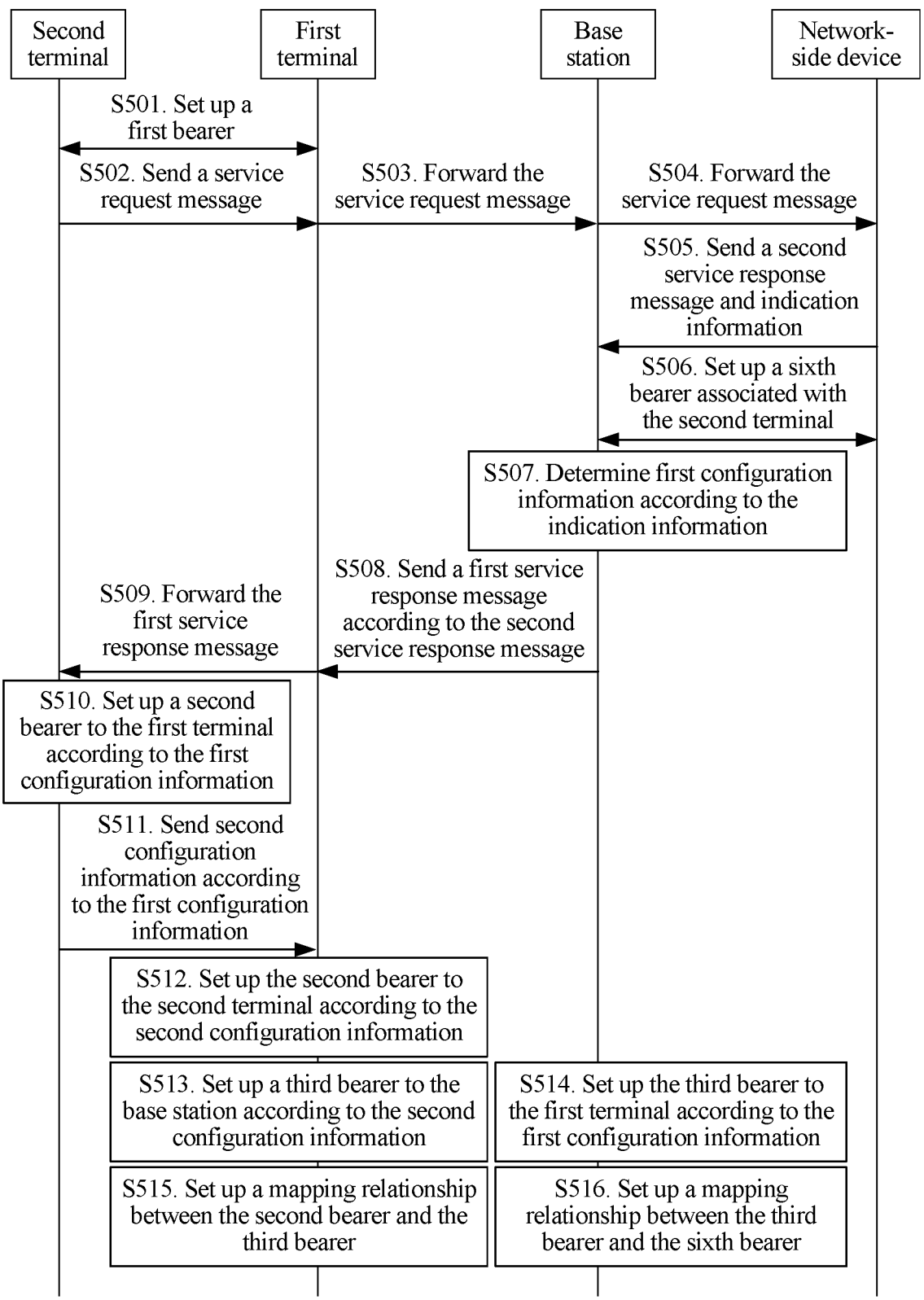
FIG. 13 is a flowchart of Embodiment 5 of a relay implementation method according to the present invention.

FIG. 13 is a flowchart of Embodiment 5 of a relay implementation method according to the present invention. As shown in FIG. 13, the method in this embodiment may include:

S501. Set up a first bearer.

In this embodiment, a second terminal sets up the first bearer to a first terminal, where the first terminal serves as a relay device between the second terminal and a base station, and the first bearer in this embodiment is an SRB1.

In a first feasible implementation manner, the second terminal sets up the first bearer to the first terminal according to bearer configuration information; correspondingly, the first terminal sets up the first bearer to the second terminal according to the bearer configuration information.

In a second feasible implementation manner, the first terminal sends (for example, by using an SRB0 between the first terminal and the second terminal) bearer configuration information to the second terminal, and correspondingly, the second terminal receives (for example, by using the SRB0) the bearer configuration information sent by the first terminal; then the second terminal sets up the first bearer to the first terminal according to the bearer configuration information, and correspondingly, the first terminal sets up the first bearer to the first terminal according to the bearer configuration information.

Optionally, the second terminal may set up a fourth bearer to the first terminal according to preset bearer configuration information, where the fourth bearer may include the SRB0 between the first terminal and the second terminal, and the SRB0 is used to transmit an RRC message on a common control channel (CCCH for short). Correspondingly, the first terminal sets up the fourth bearer to the second terminal according to the preset bearer configuration information; then the first terminal sends the bearer configuration information to the second terminal by using the fourth bearer; correspondingly, the second terminal receives, by using the fourth bearer, the bearer configuration information sent by the first terminal.

Optionally, before the first terminal sends the bearer configuration information to the second terminal, the method further includes: the first terminal sets up a fifth bearer to the base station, where the fifth bearer may include an SRB1 between the base station and the first terminal; and then the first terminal determines the bearer configuration information according to the fifth bearer, for example, the bearer configuration information is the same as configuration information of the fifth bearer. The setup of the fifth bearer to the base station by the first terminal is similar to that in the prior art, and is not further described herein.

Optionally, before the second terminal sets up the first bearer to the first terminal, the second terminal sends a relay request message to the first terminal, where the relay request message is used to request the first terminal to serve as the relay device between the second terminal and the base station; correspondingly, the first terminal receives the relay request message sent by the second terminal, and then the first terminal sets up the first bearer to the second terminal.

Optionally, before the first terminal sets up the first bearer to the second terminal, the first terminal further determines that the first terminal has a capability of serving as the relay device between the second terminal and the base station, and then the first terminal sets up the first bearer to the second terminal. Specifically, the first terminal may determine whether the first terminal has the capability of serving as the relay device, for example, determine whether resources of the first terminal are sufficient for use, or whether a quantity of bearers that are set up by the first terminal reaches a maximum value allowed by a protocol. If a determining result is yes, the first terminal determines that currently the first terminal does not have the capability of serving as the relay device, and the first terminal may reject the relay request of the second terminal. Therefore, the second terminal may search for another terminal to be used as a relay device, or the first terminal directly disables a relay function of the first terminal, and externally displays that the first terminal is a terminal having no relay capability. When the capability of the first terminal reaches a requirement for serving as a relay device, the first terminal may further enable the relay function of the first terminal, and wait to serve as a relay device to assist another terminal. If a determining result is no, the first terminal sets up the first bearer to the second terminal.

S502. Send a service request message.

In this embodiment, after the second terminal sets up the first bearer to the first terminal, the second terminal sends the service request message to the first terminal by using the first bearer. The service request message may be, for example, a registration request (Attach Request), a connection setup request (PDN CONNECTIVITY REQUEST), a service request (Service Request), or a tracking area update request (TAU request). The service request message includes at least one of the following information: a relay indication or an identity of the first terminal, where the relay indication is used to indicate that the second terminal communicates with a network-side device by using the relay device, and the identity of the first terminal is used to indicate that the second terminal communicates with the network-side device through the first terminal corresponding to the identity. Optionally, if the service request message includes the relay indication, the second terminal may send the service request message and the identity of the first terminal to the first terminal; if the service request message includes the identity of the first terminal, the second terminal may send the service request message and the relay indication to the first terminal; if the service request message does not include the relay indication and the identity of the first terminal, the second terminal may send the service request message, the relay indication, and the identity of the first terminal to the first terminal.

S503. Forward the service request message.

In this embodiment, after receiving the service request message of the second terminal by using the first bearer, the first terminal sends the service request message to the base station by using the bearer between the first terminal and the base station.

S504. Forward the service request message.

In this embodiment, after receiving the service request message sent by the second terminal and forwarded by the first terminal, the base station forwards the service request message to the network-side device.

S505. Send a second service response message and indication information.

In this embodiment, the network-side device may further send the second service response message and the indication information to the base station, where the indication information is used to determine configuration information of bearers between the base station and the second terminal, namely, first configuration information. Optionally, the second service response message includes at least one of the following information: a relay indication or an identity of the first terminal.

S506. Set up a sixth bearer associated with the second terminal.

In this embodiment, the base station sets up, according to the service request message, the sixth bearer associated with the second terminal to the network-side device.

In a first feasible implementation manner, before the base station receives, according to the service request message, the second service response message and the indication information sent by the network-side device, the base station sets up, according to the service request message, a connection associated with the second terminal to the network-side device, where the connection is an S1 connection; the network-side device may include, for example, an MME, an SGW, or a packet data network gateway (PGW for short), and in this case, after the base station forwards the service request message to the MME, the MME sets up an S1 connection associated with the second terminal to the base station. The network-side device sets up, by sending the second service response message and the indication information over the connection, the sixth bearer associated with the second terminal to the base station. Correspondingly, the base station sets up, by receiving the second service response message and the indication information over the connection, the sixth bearer associated with the second terminal to the network-side device, where the sixth bearer is an S1 bearer. For example, the MME initiates a session setup process to the SGW or the PGW. The process is used to obtain configuration information of the S1 bearer associated with the second terminal, and then the MME sends the configuration information (for example, the indication information may be used to indicate the configuration information of the S1 bearer) of the S1 bearer to the base station by using the S1 connection. The base station sets up, according to the configuration information of the S1 bearer, the S1 bearer associated with the second terminal.

In a second feasible implementation manner, before the base station receives, according to the service request message, the second service response message and the indication information sent by the network-side device, the base station sets up, according to the service request message, a connection associated with the first terminal to the network-side device, where the connection is an S1 connection; the network-side device is, for example, an MME, an SGW, or a PGW, and in this case, after the base station forwards the service request message to the MME, the MME sets up an S1 connection associated with the second terminal to the base station. The network-side device sets up, by sending the second service response message and the indication information over the connection, the sixth bearer associated with the second terminal to the base station. Correspondingly, the base station sets up, by receiving the second service response message and the indication information over the connection, the sixth bearer associated with the second terminal to the network-side device, where the sixth bearer is an S1 bearer. For example, the MME initiates a session setup process to the SGW or the PGW. The process is used to obtain configuration information of the S1 bearer associated with the second terminal, and then the MME sends the second service response message and the indication information to the base station by using the S1 connection, where the indication information is used to indicate an identity of the second terminal, and the indication information is further used to indicate the configuration information of the S1 bearer. The base station may set up, according to the configuration information of the S1 bearer and the identity of the second terminal, the S1 bearer associated with the second terminal.

In a third feasible implementation manner, the network-side device sets up, by sending the second service response message and the indication information over a connection associated with the first terminal, the sixth bearer associated with the second terminal to the base station. Correspondingly, the base station sets up, by receiving the second service response message and the indication information over the connection associated with the first terminal, the sixth bearer associated with the second terminal to the network-side device, where the sixth bearer is an S1 bearer. Herein the connection associated with the first terminal is a connection that is already set up between the base station and the network-side device, for example, the connection associated with the first terminal is set up according to the prior art.

It should be noted that, the association between the sixth bearer and the second terminal indicates that the identity of the second terminal corresponds to an identity of the sixth bearer.

Optionally, that the base station sets up the sixth bearer associated with the second terminal to the network-side device includes: the base station changes a bearer between the base station and the network-side device from associating with the first terminal to associating with the second terminal. That the network-side device sets up the sixth bearer associated with the second terminal to the base station includes: the network-side device changes the bearer between the network-side device and the base station from associating with the first terminal to associating with the second terminal. For example, the MME notifies the SGW or the PGW to modify the S1 bearer from associating with the first terminal to associating with the second terminal, and then the MME notifies, by using the S1 connection, the base station that the S1 bearer is modified from associating with the first terminal to associating with the second terminal. Modifying the S1 bearer associated with the first terminal to the S1 bearer associated with the second terminal is, for example, modifying a correspondence between the identity of the S1 bearer and the identity of the first terminal to a correspondence between the identity of the S1 bearer and the identity of the second terminal.

S507. Determine first configuration information according to the indication information.

S508. Send a first service response message according to the second service response message.

In this embodiment, after receiving the second service response message and the indication information sent by the network-side device, the base station determines the first configuration information according to the indication information; then the base station sends the first service response message to the first terminal according to the second service response message, where the first service response message may further include the second service response message. The first configuration information may include: a radio resource control (RRC for short) layer configuration information, packet data convergence (PDCP for short) layer configuration information, radio link control (RLC for short) layer configuration information, media access control (MAC for short) layer configuration information, or physical (PHY for short) layer configuration information.

S509. Forward the first service response message.

In this embodiment, after receiving the first service response message sent by the base station, the first terminal forwards the first service response message to the second terminal.

S510. Set up a second bearer to the first terminal according to the first configuration information.

In this embodiment, after receiving the first service response message forwarded by the first terminal, the second terminal sets up the second bearer to the first terminal according to the first configuration information. Specifically, the second terminal sets up the second bearer to the first terminal according to the PDCP layer configuration information in the first configuration information, and MAC layer configuration information and PHY layer configuration information that are specified in a short range transmission protocol, where the short range transmission protocol may be a Wireless Fidelity (WIFI for short) protocol or a Zigbee (English: Zigbee) protocol or a Bluetooth (English: Bluetooth) protocol or a device to device (D2D for short) protocol. Optionally, to ensure that a data packet at an upper layer may be transmitted over a lower-layer short range transmission protocol, an adaption (Adaption) layer is further disposed between a PDCP layer and a MAC layer, where the adaption layer is used to perform conversion between a PDCP layer packet and a MAC layer packet.

S511. Send second configuration information according to the first configuration information.

In this embodiment, the second terminal determines the second configuration information according to the first configuration information, where the second configuration information includes at least one of the following information: the RRC layer configuration information in the first configuration information, the PDCP layer configuration information in the first configuration information, the RLC layer configuration information in the first configuration information, the MAC layer configuration information in the first configuration information, or the PHY layer configuration information in the first configuration information, and then sends the second configuration information to the first terminal by using the first bearer.

S512. Set up the second bearer to the second terminal according to the second configuration information.

In this embodiment, after receiving, by using the first bearer, the second configuration information sent by the second terminal, the first terminal sets up the second bearer to the second terminal according to the second configuration information, and therefore, the bearer between the second terminal and the first terminal is set up successfully. Specifically, the first terminal sets up the second bearer according to the PDCP layer configuration information in the second configuration information, and the MAC layer configuration information and PHY layer configuration information that are specified in the short range transmission protocol. Optionally, if the second configuration information does not include the PDCP layer configuration information, it indicates that the PDCP layer configuration information in the first configuration information is preset in the first terminal, and the first terminal may set up the second bearer according to the preset PDCP layer configuration information, and the MAC layer configuration information and PHY layer configuration information that are specified in the short range transmission protocol, and therefore, the second bearer between the second terminal and the first terminal is set up. Because a short range transmission protocol with low power consumption is used at a lower layer of the second bearer between the second terminal and the first terminal, costs and power consumption of the second terminal are reduced. In addition, an existing communication protocol (for example, an LTE protocol) is used at an upper layer of the second bearer, so that the second terminal keeps transparent to the network-side device after the base station as much as possible.

S513. Set up a third bearer to the base station according to the second configuration information.

S514. Set up the third bearer to the first terminal according to the first configuration information.

In this embodiment, the first terminal may further set up the third bearer to the base station according to the second configuration information. The base station may also set up the third bearer to the first terminal according to the first configuration information, and therefore, the third bearer between the first terminal and the base station is set up. It should be noted that, the first configuration information includes the second configuration information, where an information difference between the first configuration information and the second configuration information may be preset on the first terminal, and then the first terminal sets up the third bearer to the base station according to the second configuration information and the preset configuration information. A configuration of the PDCP layer in the third bearer is the same as a configuration of the PDCP layer in the second bearer. It should be noted that, an execution sequence of step S513 and step S514 is not limited.

Optionally, the method in this embodiment may further include:

S515. Set up a mapping relationship between the second bearer and the third bearer.

In this embodiment, after the first terminal sets up the second bearer to the second terminal and sets up the third bearer to the base station, the first terminal further sets up the mapping relationship between the second bearer and the third bearer.

S516. Set up a mapping relationship between the third bearer and the sixth bearer.

In this embodiment, after the base station sets up the third bearer to the first terminal, the base station sets up the mapping relationship between the third bearer and the sixth bearer. Therefore, when the second terminal sends information to the network-side device, the second terminal sends the information to the first terminal by using the second bearer; the first terminal forwards, according to the mapping relationship between the second bearer and the third bearer, the information to the base station by using the third bearer; and the base station forwards, according to the mapping relationship between the third bearer and the sixth bearer, the information to the network-side device by using the sixth bearer. When the network-side device sends information to the second terminal, the network-side device sends the information to the base station by using the sixth bearer associated with the second terminal; the base station forwards, according to the mapping relationship between the third bearer and the sixth bearer, the information to the first terminal by using the third bearer; and the first terminal forwards, according to the mapping relationship between the second bearer and the third bearer, the information to the second terminal by using the second bearer. The first terminal serving as the relay device between the second terminal and the base station transparently transmits the information transmitted between the second terminal and the network-side device, thereby ensuring confidentiality of the information transmitted between the second terminal and the network-side device.

In this embodiment, a second terminal sets up a first bearer to a first terminal, and then sends a service request message to the first terminal by using the first bearer; the first terminal forwards the service request message to a network-side device by using a base station; then the base station sets up a sixth bearer to the network-side device according to the service request message; then the network-side device sends a second service response message and indication information to the base station; the base station determines first configuration information according to the indication information, and sends, according to the second service response message, a first service response message including the first configuration information to the second terminal through the first terminal. Therefore, the second terminal sets up a second bearer to the first terminal according to the first configuration information and a short range transmission protocol, the first terminal sets up a third bearer to the base station according to the first configuration information, and further, a bearer between the second terminal and the base station is set up. Therefore, a process of setting up a bearer between the second terminal and the network-side device is implemented, and further, a process in which a terminal serves as a relay device between another terminal and the base station is implemented, network deployment costs may be reduced, and network complexity may be reduced.

Figure 14:
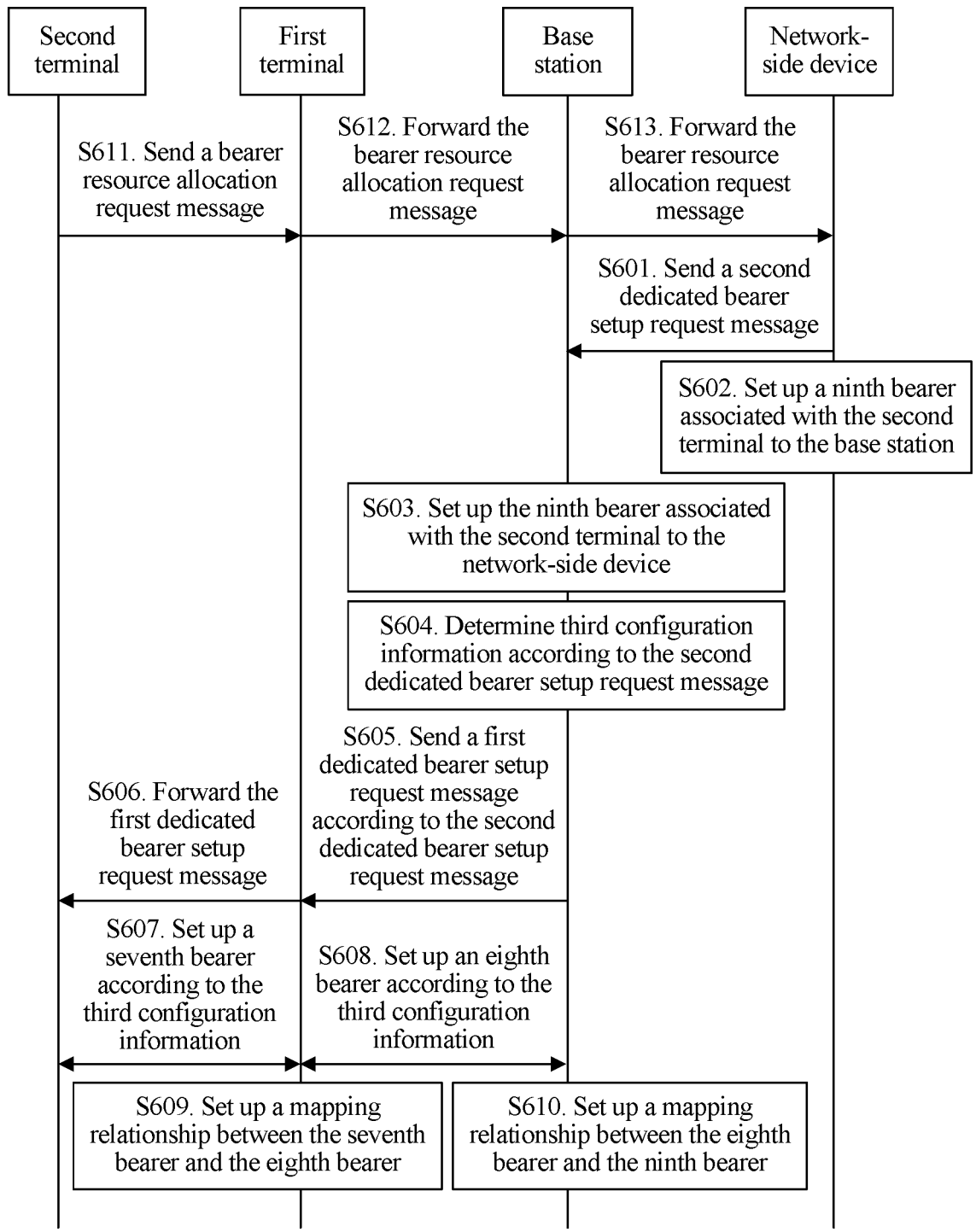
FIG. 14 is a flowchart of Embodiment 6 of a relay implementation method according to the present invention.

FIG. 14 is a flowchart of Embodiment 6 of a relay implementation method according to the present invention. As shown in FIG. 14, this embodiment is a process of setting up a dedicated bearer. The embodiment shown in FIG. 13 is a process of setting up a default bearer. On a basis of the embodiment shown in FIG. 13, the method in this embodiment may further include:

S601. Send a second dedicated bearer setup request message.

In a feasible implementation manner, the network-side device may initiate a process of setting up a dedicated bearer. After sending the second service response message and the indication information to the base station, the network-side device may further send the second dedicated bearer setup request message to the base station, where the second dedicated bearer setup request message is used to request the base station to set up a dedicated bearer associated with the second terminal to the network-side device and set up a dedicated bearer of the second terminal to the second terminal. For example, the network-side device sends the second dedicated bearer setup request message to the base station by using the connection (for example, the S1 connection) between the network-side device (for example, the MME) and the base station.

S602. Set up a ninth bearer associated with the second terminal to the base station.

In this embodiment, the network-side device sets up the ninth bearer to the base station, where the ninth bearer is associated with the second terminal, the ninth bearer is a dedicated bearer, and the ninth bearer includes a DRB. It should be noted that, an execution sequence of step S601 and step S602 is not limited.

S603. Set up the ninth bearer associated with the second terminal to the network-side device.

In this embodiment, after receiving the second dedicated bearer setup request message sent by the network-side device, the base station sets up the ninth bearer to the network-side device according to the second dedicated bearer setup request message, where the ninth bearer is associated with the second bearer, and the ninth bearer is a dedicated bearer. Therefore, the ninth bearer associated with the second terminal is set up between the base station and the network-side device successfully. The association between the sixth bearer and the second terminal indicates that the identity of the second terminal corresponds to an identity of the ninth bearer.

S604. Determine third configuration information according to the second dedicated bearer setup request message.

In this embodiment, the base station may further determine configuration information of dedicated bearers between the base station and the second terminal according to the second dedicated bearer setup request message, where the configuration information is referred to as the third configuration information.

S605. Send a first dedicated bearer setup request message according to the second dedicated bearer setup request message.

In this embodiment, the base station may send, according to the second dedicated bearer setup request message, the first dedicated bearer setup request message to the first terminal by using the bearer between the base station and the first terminal, where the first dedicated bearer setup request message includes the third configuration information.

S606. Forward the first dedicated bearer setup request message.

In this embodiment, after the first terminal receives, by using the bearer between the first terminal and the base station, the first dedicated bearer setup request message sent by the base station, the first terminal may forward the first dedicated bearer setup request message to the second terminal by using the bearer (for example, the first bearer and/or the second bearer) between the first terminal and the second terminal.

S607. Set up a seventh bearer according to the third configuration information.

In this embodiment, the second terminal sets up the seventh bearer to the first terminal according to the third configuration information in the first dedicated bearer setup request message, where the seventh bearer includes a DRB. In a first feasible implementation manner, a specific implementation process in which the second terminal sets up the seventh bearer to the first terminal according to the third configuration information is similar to a specific implementation process in which the second terminal sets up the second bearer to the first terminal according to the first configuration information. For details, reference may be made to the related description of steps S510 to S512 in method Embodiment 5 of the present invention, and no further description is provided herein.

In a second feasible implementation manner, the second terminal performs, according to the third configuration information, a bearer reconfiguration between the second terminal and the first terminal to set up the seventh bearer; the first terminal may also perform, according to the third configuration information, a bearer reconfiguration between the second terminal and the first terminal to set up the seventh bearer. The reconfigured bearer between the second terminal and the first terminal may be a DRB between the second terminal and the first terminal, for example, a DRB in the second bearer.

S608. Set up an eighth bearer according to the third configuration information.

In this embodiment, the first terminal sets up the eighth bearer to the base station according to the third configuration information, where the eighth bearer includes a DRB. In a first feasible implementation manner, a specific implementation process in which the first terminal sets up the eighth bearer to the base station according to the third configuration information is similar to a specific implementation process in which the first terminal sets up the third bearer to the base station according to the first configuration information. For details, reference may be made to the related description of steps S513 to S514 in method Embodiment 5 of the present invention, and no further description is provided herein.

In a second feasible implementation manner, the first terminal performs, according to the third configuration information, a bearer reconfiguration between the first terminal and the base station to set up the eighth bearer; the base station may also perform, according to the third configuration information, a bearer reconfiguration between the first terminal and the base station to set up the eighth bearer. The reconfigured bearer between the first terminal and the base station may be a DRB between the first terminal and the base station, for example, a DRB in the third bearer.

S609. Set up a mapping relationship between the seventh bearer and the eighth bearer.

In this embodiment, after the first terminal sets up the seventh bearer to the second terminal and sets up the eighth bearer to the base station, the first terminal further sets up the mapping relationship between the seventh bearer and the eighth bearer.

S610. Set up a mapping relationship between the eighth bearer and the ninth bearer.

In this embodiment, after the base station sets up the eighth bearer to the first terminal, the base station sets up the mapping relationship between the eighth bearer and the ninth bearer.

In this embodiment, the first terminal serves as the relay device between the second terminal and the base station to implement a process of setting up a dedicated bearer between the second terminal and the network-side device.

In another feasible implementation manner, the second terminal may initiate a process of setting up a dedicated bearer, and in this case, before step S601 is performed, the method may further include:

S611. Send a bearer resource allocation request message.

This embodiment is described by using an example in which the second terminal initiates the process of setting up a dedicated bearer. The second terminal may further send the bearer resource allocation request message to the first terminal by using the second terminal or the first bearer, where the bearer resource allocation request message is used to request allocation of dedicated bearer resources.

S612. Forward the bearer resource allocation request message.

In this embodiment, the first terminal receives, by using the first bearer or the second bearer, the bearer resource allocation request message sent by the second terminal, and then the first terminal forwards the bearer resource allocation request message to the base station by using the bearer between the first terminal and the base station.

S613. Forward the bearer resource allocation request message.

In this embodiment, the base station receives, by using the bearer between the base station and the first terminal, the bearer resource allocation request message sent by the first terminal, and then the base station forwards the bearer resource allocation request message to the network-side device.

In this embodiment, the first terminal serves as the relay device between the second terminal and the base station to implement a process of setting up a dedicated bearer between the second terminal and the network-side device.

Figure 15:
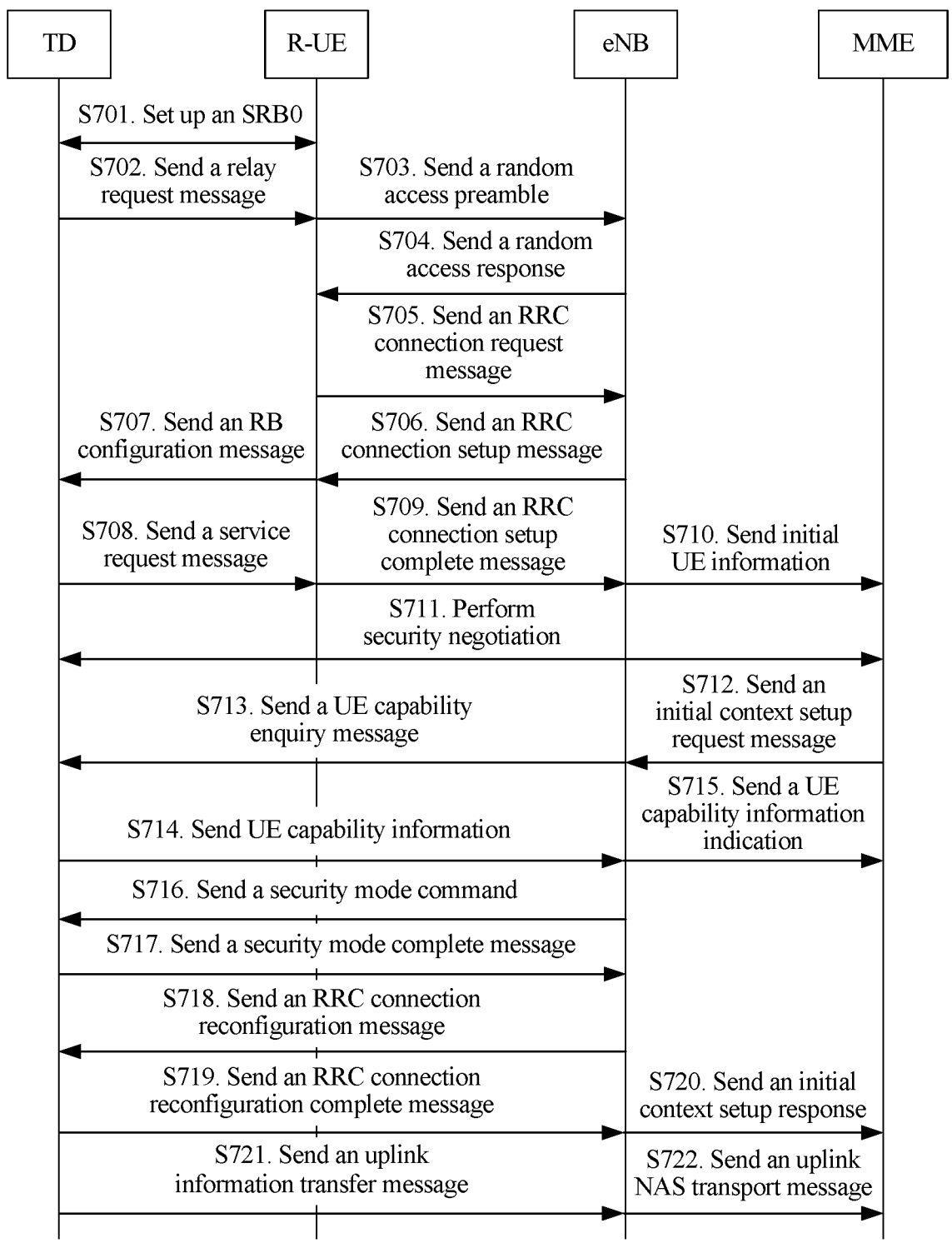
FIG. 15 is a flowchart of Embodiment 7 of a relay implementation method according to the present invention.

FIG. 15 is a flowchart of Embodiment 7 of a relay implementation method according to the present invention. As shown in FIG. 15, in this embodiment, a first terminal is a relay terminal (R-UE for short), a second terminal is a twig terminal (TD for short), a base station is an evolved NodeB (eNB for short), and a network-side device is an MME. The method in this embodiment may include:

S701. Set up an SRB0.

In this embodiment, the TD may set up the SRB0 to the R-UE by using a default configuration.

S702. Send a relay request message.

In this embodiment, the TD sends the relay request message to the R-UE by using the SRB0 between the TD and the R-UE. Optionally, the TD may also send a communication request message to the R-UE by using the SRB0 between the TD and the R-UE.

S703. Send a random access preamble.

In this embodiment, after receiving the relay request message or the communication request message sent by the TD, the R-UE sends the random access preamble (RA Preamble) to the eNB, where an SRB0 between the R-UE and the eNB exists by default. Therefore, the R-UE may send the random access preamble to the eNB by using the SRB0 between the R-UE and the eNB.

S704. Send a random access response.

In this embodiment, after receiving the random access preamble sent by the R-UE, the eNB sends the random access response (RA Response) to the R-UE.

S705. Send an RRC connection request message.

In this embodiment, after receiving the random access response sent by the eNB, the R-UE sends the RRC connection request message (RRC Connection Request) to the eNB.

S706. Send an RRC connection setup message.

In this embodiment, after receiving the RRC connection request message sent by the R-UE, the eNB sends the RRC connection setup message (RRC Connection Setup) to the R-UE, and the eNB sets up an SRB1 to the R-UE. After receiving the RRC connection setup message, the R-UE also sets up the SRB1 to the eNB.

S707. Send an RB configuration message.

In this embodiment, after the R-UE sets up the SRB1 to the eNB, the R-UE sends the RB configuration message to the TD, where the RB configuration message includes configuration information of the SRB1 between the R-UE and the eNB. Then the TD sets up an SRB1 between the TD and the R-UE to the R-UE according to the RB configuration message.

S708. Send a service request message.

In this embodiment, after the SRB1 between the TD and the R-UE is set up, the TD sends the service request message to the R-UE. For example, the TD sends an access request message (Attach request) or a PDN connection request message (PDN CONNECTIVITY REQUEST) or a service request message (Service Request) or a tracking area update request message (TAU request) to the R-UE.

S709. Send an RRC connection setup complete message.

In this embodiment, the R-UE sends the RRC connection setup complete message (RRC Connection Setup Complete) to the eNB, where the RRC connection setup complete message includes the service request message, a relay indication, and an identity of the R-UE.

S710. Send initial terminal information.

In this embodiment, after receiving the RRC connection setup complete message sent by the R-UE, the eNB sends the initial UE information (initial UE message) to the MME, where the initial UE information includes the service request message. Specifically, the eNB may send the initial UE message to the MME by using an S1 connection that is associated with the R-UE and already set up between the eNB and the MME; or the eNB sets up an S1 connection associated with the R-UE to the MME, and then sends the initial UE message to the MME by using the S1 connection; or the eNB sets up an S1 connection associated with the TD to the MME, and then sends the initial UE message to the MME by using the S1 connection.

S711. Perform security negotiation.

In this embodiment, if the TD accesses the MME for the first time, the MME initiates a negotiation process for the TD, including authentication, authorization, key negotiation (Identity/Authentication/Security) processes, and the like. The security negotiation process requires assistance from the eNB and the R-UE.

S712. Send an initial context setup request message.

In this embodiment, after receiving the initial UE message, the MME initiates a session setup process to an SGW/PGW to set up an S1 bearer associated with the TD; then the MME sends an initial context setup request message (Initial context Setup request) to the eNB, where the initial context setup request includes: a service response message and an activate default EPS bearer context request message (Activate default EPS bearer context request), where the service response message is, for example, an access response message (Attach Accept), or a PDN connection response message (PDN Connectivity Accept), or a service response message (Service Accept), or a tracking area update response message (TAU Accept). After receiving the Initial context Setup request, the eNB sets up the S1 bearer to the SGW/PGW.

S713. Send a UE capability enquiry message.

In this embodiment, the eNB sends the UE capability enquiry message (UE Capability Enquiry) to the TD by using the R-UE. That is, the eNB sends the UE Capability Enquiry to the R-UE, and the R-UE forwards the UE Capability Enquiry to the TD.

S714. Send UE capability information.

In this embodiment, after receiving the UE Capability Enquiry, the TD sends the UE capability information (UE Capability Information) to the eNB by using the R-UE.

S715. Send a UE capability information indication.

In this embodiment, after receiving, by using the R-UE, the UE capability information sent by the TD, the eNB sends the UE capability information indication (UE Capability Info Indication) to the MME, so that the MME obtains the UE capability information according to the UE Capability Info Indication.

S716. Send a security mode command.

In this embodiment, the eNB sends the security mode command (Security Mode Command) to the TD by using the R-UE.

S717. Send a security mode complete message.

In this embodiment, the TD receives, by using the R-UE, the security mode complete message (Security Mode Complete) sent by the eNB.

S718. Send an RRC connection reconfiguration message.

In this embodiment, the eNB may set up an SRB2 and a DRB to the R-UE according to the Initial context Setup request, and then sends the RRC connection reconfiguration message (RRC Connection Reconfiguration) to the TD by using the R-UE, where the RRC Connection Reconfiguration includes a service response message and an Activate default EPS bearer context request.

S719. Send an RRC connection reconfiguration complete message.

In this embodiment, after the TD receives the RRC connection reconfiguration message, where the RRC connection reconfiguration message may further include configuration information of the SRB2 and DRB, the TD sets up an SRB2 and a DRB to the R-UE according to the RRC connection reconfiguration message. Then the TD sends the RRC connection reconfiguration complete message (RRC Connection Reconfiguration Complete) to the R-UE, where the RRC connection reconfiguration complete message includes configuration information of the SRB2 and DRB. The R-UE sets up the SRB2 and the DRB to the TD according to the RRC connection reconfiguration complete message, and further sets up the SRB2 and DRB to the eNB, and then sends the RRC connection reconfiguration complete message to the eNB.

S720. Send an initial context setup response.

In this embodiment, after receiving the RRC connection reconfiguration complete message sent by the TD by using the R-UE, the eNB sends an initial context setup response (Initial context setup response) to the MME.

S721. Send an uplink information transfer message.

In this embodiment, the TD sends the uplink information transfer message (UL Information Transfer) to the eNB by using the R-UE, where the Uplink information transfer message includes: a service complete message and an activate default EPS bearer context response message (Activate default EPS bearer context accept). The service complete message is, for example, an attach complete service complete message, or a PDN connection complete message (PDN Connectivity Complete), or a service complete message, or a TAU complete message (TAU Complete).

S722. Send an uplink NAS transport message.

In this embodiment, after the eNB receives, by using the R-UE, the Uplink information transfer message sent by the TD, the eNB sends the uplink NAS transport message (UL NAS Transport) to the MME, where the UL NAS Transport includes a service response message and an activate default EPS bearer context response message.

It should be noted that, in another feasible implementation manner, the foregoing steps S703 to S706 are performed before step S701, that is, a bearer between the R-UE and the eNB already exists. In this case, step S709 is to send an uplink information transfer message (UL Information Transfer), that is, the R-UE sends the Uplink information transfer message to the eNB.

In this embodiment, a process in which a terminal serves as a relay device between another terminal and an eNB is implemented, network deployment costs may be reduced, and network complexity may be reduced.

Figure 16:
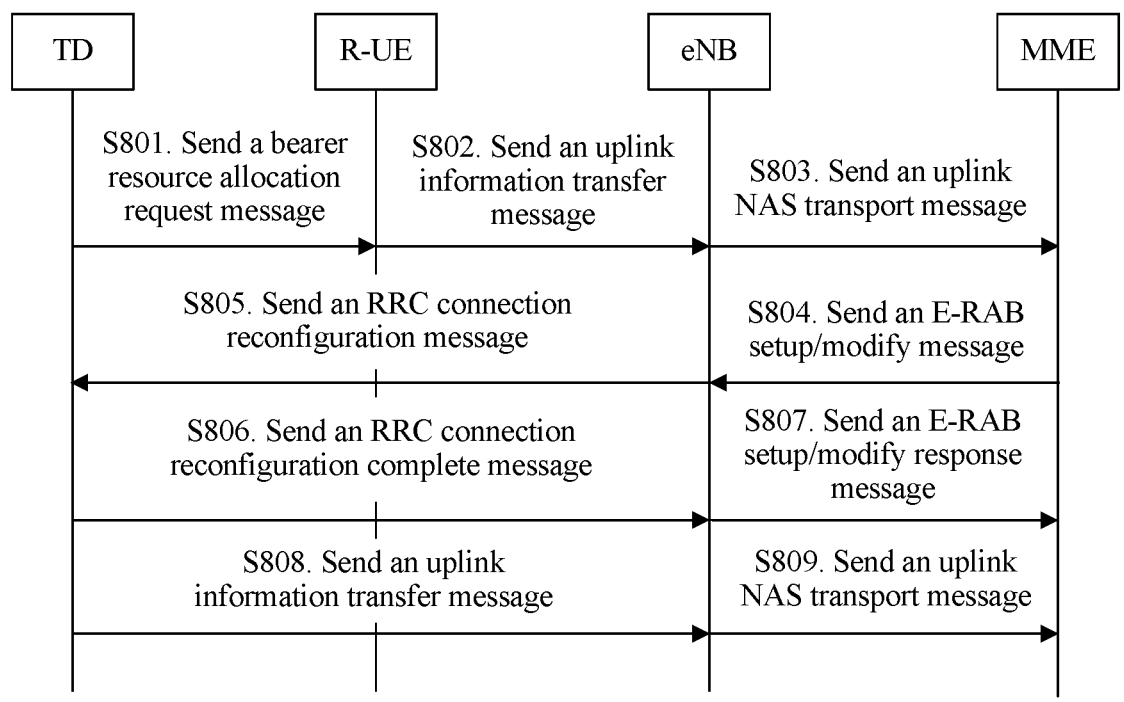
FIG. 16 is a flowchart of Embodiment 8 of a relay implementation method according to the present invention.

FIG. 16 is a flowchart of Embodiment 8 of a relay implementation method according to the present invention. As shown in FIG. 16, on a basis of the embodiment shown in FIG. 15, the method in this embodiment may further include:

S801. Send a bearer resource allocation request message.

In this embodiment, when the TD initiates setup of a dedicated bearer, the TD sends the bearer resource allocation request message (Bearer resource allocation request) to the R-UE.

S802. Send an uplink information transfer message.

In this embodiment, after the R-UE receives the bearer resource allocation request message sent by the TD, the R-UE sends the uplink information transfer message (UL Information Transfer) to the eNB, where the Uplink information transfer message includes the bearer resource allocation request.

S803. Send an uplink NAS transport message.

In this embodiment, after the eNB receives the Uplink information transfer message sent by the R-UE, the eNB sends the uplink NAS transport message (UL Information Transport) to the MME, where the UL Information Transport includes the Bearer resource allocation request.

S804. Send an E-RAB setup/modify message.

In this embodiment, after the MME receives the UL Information Transport sent by the eNB, the MME notifies the SGW/PGW to set up a dedicated bearer associated with the TD to the eNB, and in this case, the MME sends an E-RAB setup message (E-RAB Setup) to the eNB, where the E-RAB setup message includes an activate dedicated EPS bearer context request message (Activate dedicated EPS bearer context request). Alternatively, after the MME receives the UL Information Transport sent by the eNB, the MME notifies the SGW/PGW to modify a default bearer associated with the TD to the eNB, to a dedicated bearer, and in this case, the MME sends an E-RAB modify message (E-RAB Modify) to the eNB, where the E-RAB modify message includes a modify dedicated EPS bearer context request message (Modify dedicated EPS bearer context request).

S805. Send an RRC connection reconfiguration message.

In this embodiment, after the eNB receives the E-RAB setup message or the E-RAB modify message sent by the MME, the eNB sets up a dedicated bearer associated with the TD to the SGW/PGW, or modifies the default bearer associated with the TD to the SGW/PGW, to a dedicated bearer. Then the RRC connection reconfiguration message is sent to the TD by using the R-UE, where the RRC connection reconfiguration message includes the activate dedicated EPS bearer context request message or the modify dedicated EPS bearer context request message. The eNB may also set up a dedicated bearer to the R-UE, or the eNB may modify a default bearer to the R-UE, to a dedicated bearer.

S806. Send an RRC connection reconfiguration complete message.

In this embodiment, after the TD receives, by using the R-UE, the RRC connection reconfiguration message sent by the eNB, the TD sets up a dedicated bearer to the R-UE, or modifies the default bearer to the R-UE, to a dedicated bearer, and then the TD sends the RRC connection reconfiguration complete message to the R-UE, where the RRC connection reconfiguration complete message includes configuration information of the dedicated bearer that is set up by the TD. The R-UE sets up a dedicated bearer to the TD according to the RRC connection reconfiguration complete message, or modifies the default bearer to the TD, to a dedicated bearer; the R-UE may further set up a dedicated bearer to the eNB according to the RRC connection reconfiguration complete message, or modify the default bearer to the eNB, to a dedicated bearer; therefore, a dedicated bearer between the TD and the eNB is set up successfully. Then the R-UE sends the RRC connection reconfiguration complete message to the eNB.

S807. Send an E-RAB setup/modify response message.

In this embodiment, after receiving the RRC connection reconfiguration complete message, the eNB sends an E-RAB setup response message (E-RAB Setup Response) or an E-RAB modify response message (E-RAB Modify Response) to the MME.

S808. Send an uplink information transfer message.

In this embodiment, the TD sends the uplink information transfer message (UL Information Transfer) to the eNB by using the R-UE, where the Uplink information transfer message includes an activate dedicated EPS bearer context response message (Activate dedicated EPS bearer context accept) or a modify dedicated EPS bearer context response message (Modify dedicated EPS bearer context accept).

S809. Send an uplink NAS transport message.

In this embodiment, after the eNB receives, by using the R-UE, the Uplink information transfer message sent by the TD, the eNB sends the uplink NAS transport message (UL NAS Transport) to the MME, where the UL NAS Transport includes the activate dedicated EPS bearer context response message or the modify dedicated EPS bearer context response message.

It should be noted that, in another feasible implementation manner, the process of setting up a dedicated bearer may be initiated by the MME, and in this case, the foregoing steps S801 to S803 do not need to be performed.

In this embodiment, the R-UE serves as a relay device between the TD and the eNB to implement the process of setting up a dedicated bearer between the TD and the network-side device, which may save network deployment costs, and reduce network complexity.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A terminal, wherein the terminal serves as a first terminal and comprises:
  at least one processor, configured to set up a first bearer to a second terminal, wherein the first terminal serves as a relay device between the second terminal and a base station;
  a receiver, configured to receive, by using the first bearer, a service request message sent by the second terminal as a machine to machine (M2M) control command; and
  a transmitter, configured to forward, to the base station, the service request message received by the receiver as a radio resource control (RRC) command; wherein
  the receiver is further configured to receive a first service response message sent by the base station;
  the transmitter is further configured to forward the first service response message to the second terminal by using the first bearer, wherein the first service response message comprises first configuration information, and the first configuration information is configuration information of bearers between the base station and the second terminal; and
  the at least one processor is further configured to:
    set up a second bearer to the second terminal and a third bearer to the base station according to third configuration information, wherein the second bearer and the third bearer serve as the bearers between the second terminal and the base station; and
    set up, by the first terminal serving as the relay device between the second terminal and the base station, a mapping relationship between the second bearer to the second terminal and the third bearer to the base station.

2. The terminal according to claim 1, wherein that the at least one processor is further configured to set up a first bearer to a second terminal comprises: being configured to set up the first bearer to the second terminal according to bearer configuration information; or
  the transmitter is further configured to send bearer configuration information to the second terminal before the at least one processor sets up the first bearer to the second terminal; and that the at least one processor is configured to set up a first bearer to a second terminal comprises: being configured to set up the first bearer to the second terminal according to the bearer configuration information sent by the transmitter.

3. The terminal according to claim 2, wherein the at least one processor is further configured to set up a fourth bearer to the second terminal according to preset bearer configuration information before the transmitter sends the bearer configuration information to the second terminal; and that the transmitter is further configured to send bearer configuration information to the second terminal comprises: being configured to send the bearer configuration information to the second terminal by using the fourth bearer.

4. The terminal according to claim 2, wherein the at least one processor is further configured to: before the transmitter sends the bearer configuration information to the second terminal, set up a fifth bearer to the base station, and determine the bearer configuration information according to the fifth bearer.

5. The terminal according to claim 1, wherein the receiver is further configured to receive, before the at least one processor sets up the first bearer to the second terminal, a relay request message sent by the second terminal, wherein the relay request message is used to request the first terminal to serve as the relay device between the second terminal and the base station.

6. The terminal according to claim 1, wherein the at least one processor is further configured to determine, before setting up the first bearer to the second terminal, that the first terminal has a capability of serving as the relay device between the second terminal and the base station.

7. The terminal according to claim 1 wherein the third configuration information is the first configuration information; or
  the third configuration information is second configuration information, and the receiver is further configured to receive, by using the first bearer, the second configuration information sent by the second terminal, wherein the second configuration information is configuration information determined by the second terminal according to the first configuration information.

8. The terminal according to claim 7, wherein the first configuration information comprises at least one of the following information: radio resource control (RRC) layer configuration information, packet data convergence protocol (PDCP) layer configuration information, radio link control (RLC) layer configuration information, media access control (MAC) layer configuration information, or physical (PHY) layer configuration information; and
  the second configuration information comprises at least one of the following information: the RRC layer configuration information, the PDCP layer configuration information, the RLC layer configuration information, the MAC layer configuration information, or the PHY layer configuration information.

9. The terminal according to claim 7, wherein that the at least one processor is further configured to set up the second bearer to the second terminal according to the second configuration information comprises: being configured to set up the second bearer according to the PDCP layer configuration information in the second configuration information, and MAC layer configuration information and PHY layer configuration information that are specified in a short range transmission protocol, wherein a configuration of a PDCP layer in the second bearer is the same as a configuration of a PDCP layer in the third bearer.

10. The terminal according to claim 1, wherein at least one of:
  the service request message received by the receiver comprises at least one of the following information: a relay indication or an identity of the first terminal; or
  the first service response message received by the receiver comprises at least one of the following information: a relay indication or an identity of the first terminal; and wherein the relay indication is used to indicate that the second terminal communicates with a network-side device by using the relay device, and the identity of the first terminal is used to indicate that the second terminal communicates with the network-side device through the first terminal corresponding to the identity.

11. The terminal according to claim 1, wherein the first bearer comprises a first signaling radio bearer, the second bearer comprises a second signaling radio bearer and a data radio bearer, and the third bearer comprises a second signaling radio bearer and a data radio bearer.

12. A terminal, wherein the terminal serves as a second terminal and comprises:
at least one processor, configured to set up a first bearer to a first terminal, wherein the first terminal serves as a relay device between the second terminal and a base station;
a transmitter, configured to send a service request message as a machine to machine (M2M) control command to the first terminal by using the first bearer, wherein the first terminal forwards the service request message as a radio resource control (RRC) command to the base station; and
a receiver, configured to receive, by using the first bearer, a first service response message sent by the base station and forwarded by the first terminal, wherein the first service response message comprises first configuration information, and the first configuration information is configuration information of bearers between the base station and the second terminal; wherein
the at least one processor is further configured to set up a second bearer to the first terminal according to the first configuration information, wherein the first terminal maps the second bearer to a third bearer to the base station.

13. The terminal according to claim 12 wherein that the at least one processor is further configured to set up a first bearer to a first terminal comprises: being configured to set up the first bearer to the first terminal according to bearer configuration information; or
the receiver is further configured to receive, before the at least one processor sets up the first bearer to the first terminal, bearer configuration information sent by the first terminal; and that the at least one processor is further configured to set up a first bearer to a first terminal comprises: being configured to set up the first bearer to the first terminal according to the bearer configuration information received by the receiver.

14. The terminal according to claim 13, wherein the at least one processor is further configured to set up a fourth bearer to the first terminal according to preset bearer configuration information before the receiver receives the bearer configuration information sent by the first terminal; and
that the receiver is further configured to receive bearer configuration information sent by the first terminal comprises: being configured to receive, by using the fourth bearer, the bearer configuration information sent by the first terminal.

15. The terminal according to claim 12, wherein the transmitter is further configured to send a relay request message to the first terminal before the at least one processor sets up the first bearer to the first terminal, wherein the relay request message is used to request the first terminal to serve as the relay device between the second terminal and the base station.

16. A base station, comprising:
a receiver, configured to receive, according to a service request message, a second service response message and indication information sent by a network-side device, wherein the service request message is a service request message sent by a second terminal as a machine to machine (M2M) control command and forwarded by a first terminal as a radio resource control (RRC) command, the indication information is used to determine first configuration information, and the first configuration information is configuration information of bearers between the base station and the second terminal;
at least one processor, configured to:
set up, according to the indication information, a first bearer associated with the second terminal to the network-side device, determine the first configuration information according to the indication information, and set up a second bearer to the first terminal according to the first configuration information; and
set up a mapping relationship between the first bearer and the second bearer; and
a transmitter, configured to send, according to the second service response message received by the receiver, a first service response message to the second terminal through the first terminal, wherein the first service response message comprises the first configuration information.

17. The base station according to claim 16, wherein the at least one processor is further configured to set up, according to the service request message, a connection associated with the second terminal to the network-side device before the receiver receives, according to the service request message, the second service response message and the indication information sent by the network-side device; and that the at least one processor is further configured to set up, according to the indication information, a first bearer associated with the second terminal to the network-side device comprises: being configured to set up, by receiving the second service response message and the indication information over the connection by using the receiver, the first bearer associated with the second terminal to the network-side device.

18. The base station according to claim 16, wherein the at least one processor is further configured to set up, according to the service request message, a connection associated with the first terminal to the network-side device before the receiver receives, according to the service request message, the second service response message and the indication information sent by the network-side device; and that the at least one processor is further configured to set up, according to the indication information, a first bearer associated with the second terminal to the network-side device comprises: being configured to set up, by receiving the second service response message and the indication information over the connection by using the receiver, the first bearer associated with the second terminal to the network-side device, wherein the indication information is further used to indicate an identity of the second terminal.

19. The base station according to claim 17, wherein that the at least one processor is further configured to set up the first bearer associated with the second terminal to the network-side device comprises: being configured to change a bearer between the base station and the network-side device from associating with the first terminal to associating with the second terminal.

* * * * *